United States Patent
Lei et al.

(10) Patent No.: US 8,107,751 B2
(45) Date of Patent: Jan. 31, 2012

(54) DPCM WITH ADAPTIVE RANGE AND PCM ESCAPE MODE

(75) Inventors: Shawmin Lei, Camas, WA (US);
Masayuki Yamaguchi, Kyoto (JP);
Akihisa Yamada, Nara (JP); Shinichi Maeta, Nara (JP)

(73) Assignee: Sharp Laboratories of America, Inc., Camas, WA (US)

( * ) Notice: Subject to any disclaimer, the term of this patent is extended or adjusted under 35 U.S.C. 154(b) by 1103 days.

(21) Appl. No.: 11/687,553

(22) Filed: Mar. 16, 2007

(65) Prior Publication Data
US 2008/0226183 A1 Sep. 18, 2008

(51) Int. Cl.
G06K 9/36 (2006.01)
G06K 9/46 (2006.01)
H04B 14/04 (2006.01)
H04B 14/06 (2006.01)

(52) U.S. Cl. .................. 382/238; 375/242; 375/244
(58) Field of Classification Search .......... 382/232–248; 375/240–250; 704/500–504
See application file for complete search history.

(56) References Cited

U.S. PATENT DOCUMENTS

| | | | | |
|---|---|---|---|---|
| 4,023,199 A | | 5/1977 | Netravali et al. | |
| 4,255,763 A | * | 3/1981 | Maxemchuk et al. | ... 375/240.12 |
| 4,282,406 A | * | 8/1981 | Yato et al. | ...... 704/207 |
| 4,369,463 A | | 1/1983 | Anastassiou et al. | |
| 4,573,167 A | | 2/1986 | Hentschke et al. | |
| 4,745,473 A | * | 5/1988 | Hall | ............ 348/396.1 |
| 4,785,356 A | * | 11/1988 | Gonzales et al. | ............. 382/238 |
| 5,128,963 A | * | 7/1992 | Akagiri | ......................... 375/244 |
| 5,376,968 A | | 12/1994 | Wu et al. | |
| 5,384,849 A | * | 1/1995 | Jeong | ......................... 348/425.2 |
| 5,852,682 A | * | 12/1998 | Kim | .............................. 382/268 |
| 6,983,017 B2 | | 1/2006 | Chen et al. | |
| 2004/0202375 A1 | * | 10/2004 | Kalevo | ......................... 382/239 |

OTHER PUBLICATIONS

Westerink et al. "Subband coding of images using vector quantization", IEEE Trans. on Communications, v36, No. 6, 1988, pp. 713-719.*
Staffan Ericsson, "Fixed and adaptive predictors for hybrid predictive/transform coding", IEEE Trans. on Communications, vol. com-33, No. 12, 1985, pp. 1291-1302.*
Michael Yuen et al. "A survey of hybrid MC/DPCM/DCT video coding distortions", Signal Processing 70, 1998, 247-278.*
Microsoft Support article ID 126455, updated on Dec. 9, 2003.*
Jayant N.S and Noll, Peter,"Digital Coding of Waveforms," 1984, pp. 252-350 , Prentice-Hall Processing Series, USA.

* cited by examiner

*Primary Examiner* — Samir Ahmed
*Assistant Examiner* — Li Liu
(74) *Attorney, Agent, or Firm* — Michael Blaine Brooks, PC; Pejman Yedidsion; David Ripma

(57) ABSTRACT

The embodiments of the present invention provide for methods, devices, and systems adapted to perform adaptive quantization processes. The adaptive quantization processes of the present invention are adapted to provide one or more adaptive quantization modes based on one or more previous pixels and their associated coding modes. The output of an adaptive quantization process may include coded data and a coding mode, indicating whether the coded data is pulse code modulation (PCM) data or differential pulse code modulation (DPCM) data.

24 Claims, 19 Drawing Sheets

```
BitsSent = 5 ◄────── 602
for each pixel
    { //Get Quantization Parameter, using neighbor_modes from
      //Quantization Table       604
                          ⌢⌢⌢⌢⌢⌢⌢⌢⌢⌢
        Quant = QuantTable[neighbors_modes] ◄────── 606

MaxABS = 2^(BitsSent+Quant-1) ◄────── 612

//Determine if any diff. signal/pred. error is out of range, set Out of
          Range flag accordingly
        for each color in (R, G, B) {
616 {           D_color = Current_Data_color – Previous_Data_color
                    if (D_color < –MaxABS OR D_color >= MaxABS) {
                        OutOfRange_color = 1
                    } else {
                        OutOfRange_color = 0
                    }
        }
        // If any difference signal/pred. error is out of range, set the current_flag
        if (OutOfRange_R == 1 OR OutOfRange_G == 1 OR OutOfRange_B == 1) {
                current_flag = 1 ◄────── 620        //PCM coding mode
        } else {
                current_flag = 0 ◄────── 622        //DPCM coding mode
        }
        write(current_flag)    // 1 bit // Encode data                                    QP of PCM
        for each color in (R, G, B) {
                if (current_flag == 1) {    // PCM Mode
634 ──────►        output = (Current_Data_color + 16) >> 5
                                        // plus 16 is for rounding
642 ──────►        if (output >= 2^BitsSent)
                        output = 2^BitsSent – 1    // overflow protection
                } else {                       // DPCM Mode
628 {
638 ──────►        output = (D_color + 2^(Quant-1)) >> Quant
                                        // plus 2^(Quant-1) is for rounding 648 ──────► if (output >= 2^(BitsSent-1)) output = 2^(BitsSent-1) – 1
                                        // overflow protection
                }
                // Note that output is in 2's complement representation for
                //  negative number
                write(the least significant BitsSent bits of output)   // 5 bits
        }
        neighbors_modes = update_neighbors_modes(current_flag) ◄────── 650
    }
}
```

FIG. 6

```
BitsSent = 5
QuantPCM = 5    //QP of PCM  ←———— 802
        //QuantPCM - quantization parameter for PCM mode denoting
        //quantization step size of $2^{QuantPCM}$
for each pixel {
        //Determine QP based on Previous Pixels (neighbor_modes)
        Quant = QuantTable[neighbors_modes]
        //
818 ——→ MaxABS = $2^{BitsSent+Quant-1}$ + ExtendedRange //Determine if any diff. signal/pred. error is out of range, set Out of
          Range flag accordingly
        for each color in (R, G, B) {
822 ——→   $D_{color}$ = $Current\_Data_{color}$ − $Previous\_Data_{color}$ +$2^{Quant-1}$
                                        //plus $2^{Quant-1}$ is for rounding
            if ($D_{color}$ < −MaxABS OR $D_{color}$ >= MaxABS) {
                    $OutOfRange_{color}$ = 1
            } else {
                    $OutOfRange_{color}$ = 0
            }
        }
        // If any difference signal/pred. error is out of range, set the current_flag
826 ——→ if ($OutOfRange_R$ == 1 OR $OutOfRange_G$ == 1 OR $OutOfRange_B$ == 1) {
                current_flag = 1                    //PCM coding mode
        } else {
                current_flag = 0                    //DPCM coding mode
        }
        write(current_flag)        // 1 bit
```

FIG. 8A

```
// Encode data
for each color in (R, G, B) {
        if (current_flag == 1) {        // PCM Mode
    858 ──▶  output = (Current_Data_color + 2^{QuantPCM-1}) >> QuantPCM
                                // plus 2^{QuantPCM-1} is for rounding
            if (output >= 2^{BitsSent}) output = 2^{BitsSent} - 1  // overflow protection
        } else {                        // DPCM Mode
    852 ──▶     output = D_color >> Quant
            // overflow protection
            if (output >= 2^{BitsSent-1}) output = 2^{BitsSent-1} - 1
            //underflow protection
    856 ──▶     else if (output < -2^{BitsSent-1}) output = -2^{BitsSent-1}
        }
            // Note that output is in 2's complement representation for
            // negative number write(the least significant BitsSent bits of output)  // 5 bits

} neighbors_modes = update_neighbors_modes(current_flag)
}
```

FIG. 8B

```
BitsSent = 5
for each pixel {
        if (previous_flag == 0) {         ← 902
           Quant = 0 ← 904
        } else {
           Quant = 2  ← 908
        }
        // Determine if any data is out of range and set the current flag accordingly
        for each color in (R, G, B) {
                $D_{color}$ = Current_Data $_{color}$ − Previous_Data $_{color}$
                MaxABS = $2^{BitsSent+Quant-1}$
                if ($D_{color}$ < −MaxABS OR $D_{color}$ >= MaxABS) {
                        OutOfRange$_{color}$ = 1
                } else {
                        OutOfRange$_{color}$ = 0
                }
        }
        if (OutOfRange$_R$ == 1 OR OutOfRange$_G$ == 1 OR OutOfRange$_B$ == 1) {
            current_flag = 1
        } else {
            current_flag = 0
        }
        write(current_flag)       // 1 bit
        // Code data
        for each color in (R, G, B) {
                if (current_flag == 1) { // PCM Mode          QP of PCM
                        // plus 16 is for rounding
                        output = (Current_Data $_{color}$ + 16)>>5
                } else {                  // DPCM Mode
                        output =($D_{color}$ + $2^{Quant-1}$)>>Quant
                        //plus $2^{Quant-1}$ is for rounding
                }
                // Note that output is in 2's complement representation for
                // negative number
                write(the least significant BitsSent bits of output) // 5 bits
                }
                previous_flag = current_flag
        }
}
```

FIG. 9

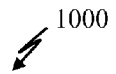

```
BitsSent = 5
for each pixel {
        if (previous_flag == 0) {
                Quant = 0
        } else {
                Quant = 2
        }
        // Decode data
          current_flag = read(1 bit)       // Read in the current_flag (1 bit)
          for each color in (R, G, B) {
                  if (current_flag == 1) {  // PCM Mode
                          Current_Data color = read(5 bits)<<5
                  } else {                  // DPCM Mode
                          temp = read(5 bits) and extend the sign bit
                          Current_Data color = (temp << Quant) + Previous_Data color
                  }
          }
          previous_flag = current_flag
}
//The previous_flag in the encoder and decoder (e.g., FIGs. 9 and 10) may be
initialized to 1 at the beginning of each image line or frame.
```

FIG. 10

*BitsSent* = 5
*QuantPCM* = 5
for each *pixel* {
    *Quant* = *QuantTable*[*neighbors_modes*]
    $MaxABS = 2^{BitsSent+Quant-1}$
// Determine if any data is out of range and set the current flag accordingly
    for each *color* in (R, G, B) {
        // DPCM mode
        $D_{color}$ = *Current_Data*$_{color}$ − *Previous_Data*$_{color}$
        $DPCM_{color} = (D_{color} + 2^{Quant-1}) >> Quant$
        // overflow protection
        if $(DPCM_{color} >= 2^{BitsSent-1})$ $DPCM_{color} = 2^{BitsSent-1} - 1$
        // underflow protection
        else if $(DPCM_{color} < -2^{BitsSent-1})$ $DPCM_{color} = -2^{BitsSent-1}$
        $E_{DPCM}$ = ABS( $D_{color}$ − ($DPCM_{color}$ << *Quant*) )
        //Abs. Error of DPCM mode

// PCM mode
        $PCM_{color}$ = (*Current_Data*$_{color}$ + $2^{QuantPCM-1}$) >> *QuantPCM*
        if $(PCM_{color} >= 2^{BitsSent})$ $PCM_{color} = 2^{BitsSent} - 1$
        // overflow protection
        $E_{PCM}$ = ABS(*Current_Data*$_{color}$ − ($PCM_{color}$ << *Quant*))
        // Absolute error of PCM mode if ( ($D_{color}$ < −*MaxABS* OR $D_{color}$ >= *MaxABS*) AND $E_{PCM} < E_{DPCM}$ ){
            *OutOfRange*$_{color}$ = 1
        } else {
            *OutOfRange*$_{color}$ = 0 }
        }
    }
    if (*OutOfRange*$_R$ == 1 OR *OutOfRange*$_G$ == 1 OR *OutOfRange*$_B$ == 1) {
        *current_flag* = 1
    } else {
        *current_flag* = 0
    }
    write(*current_flag*)    // 1 bit

FIG. 14A

```
// Output data
for each color in (R, G, B) {
        if (current_flag == 1) {    // PCM MODE
                write( the least significant BitsSent bits of PCM_color)    // 5 bits
        } else {                    // DPCM MODE
                write( the least significant BitsSent bits of DPCM_color)   // 5 bits
        }
        // Note that 2's complement representation is used for negative
numbers
   } neighbors_modes = update_neighbors_modes(current_flag)
}
```

DPCM WITH ADAPTIVE RANGE AND PCM ESCAPE MODE

FIELD OF THE INVENTION

The embodiments of the present invention relate to data compression, particularly data compression employing differential pulse-code modulation, with adaptive quantization.

BACKGROUND

With the proliferation of digital data, techniques of compressing data are desirable to minimize, for example, storage space or data being transmitted between a sender and a receiver. Such compression techniques may be used in various applications, such as, but not limited to, image processors, analog-to-digital converters, coders, e.g., encoder and/or decoders, buffer storage, and streaming data transmission. Methods, devices, and systems that provide compression technology are thus highly desirable.

SUMMARY

In one aspect, a method of processing an image comprising a plurality of pixels is provided. The method includes the steps of: receiving a sample pixel of said image; determining a range of values based on a number of coding bits and a quantization parameter; determining a difference signal value based on said sample pixel and a predicted value of said sample pixel; determining a quantized sample pixel value based on said sample pixel; determining whether said difference signal is within said range of values; and if said difference signal is within said range of values, then assigning a sample pixel coding mode comprising one bit associated with said sample pixel to a mode indicating that said sample pixel is coded as differential pulse-code modulation (DPCM) data; coding said sample pixel as a quantized difference signal based on said quantization parameter; and outputting said sample pixel coding mode and said quantized difference signal value as an output data; otherwise, if said difference signal is not within said range of values, then assigning said sample pixel coding mode comprising one bit associated with said sample pixel to a mode indicating that said sample pixel is coded as pulse-code modulation (PCM) data; coding said sample pixel as said quantized sample pixel value; and outputting said sample pixel coding mode and said quantized sample pixel value as an output data.

In another aspect, a method of processing an image comprising a plurality of pixels is provided. The method includes the steps of: receiving a sample pixel of said image; determining a difference signal value based on said sample pixel and a predicted value of said sample pixel; determining a quantized difference signal value based on said difference signal value and a quantization parameter; determining a differential pulse-code modulation (DPCM) error based on deducting said quantized difference signal value from said difference signal value; determining a quantized sample pixel value based on said received sample pixel; determining a pulse-code modulation (PCM) error based on deducting said quantized sample pixel value from said received sample pixel; determining a range of values based on a number of coding bits and said quantization parameter; if said difference signal value is not within said determined range of values and if said PCM error is less than said DPCM error, then assigning said sample pixel coding mode comprising one bit associated with said sample pixel to a mode indicating that said sample pixel is coded as PCM data; coding said sample pixel as said quantized sample pixel value; and outputting said sample pixel coding mode and said quantized sample pixel value as an output data; otherwise, assigning a sample pixel coding mode comprising one bit associated with said sample pixel to a mode indicating that said sample pixel is coded as DPCM data; coding said sample pixel as said quantized difference signal; and outputting said sample pixel coding mode and said quantized difference signal as an output data.

In another aspect, a device adapted to process an image comprising a plurality of pixels is provided. The device includes a receiver, a pulse-code modulation module and an adaptive quantization module. The receiver is adapted to receive a sample pixel of said image. The pulse-code modulation module is adapted to determine a quantized sample pixel value based on said sample pixel. The adaptive quantization module is adapted to: determine a range of values based on a number of coding bits and a quantization parameter; determine a difference signal value based on said sample pixel and a predicted value of said sample pixel; determine whether said difference signal is within said range of values; and if said difference signal is within said range of values, then assign a sample pixel coding mode comprising one bit associated with said sample pixel to a mode indicating that said sample pixel is coded as differential pulse-code modulation (DPCM) data; code said sample pixel as a quantized difference signal based on said quantization parameter; and output said sample pixel coding mode and said quantized difference signal value as an output data; otherwise, if said difference signal is not within said range of values, then assign said sample pixel coding mode comprising one bit associated with said sample pixel to a mode indicating that said sample pixel is coded as pulse-code modulation (PCM) data; code said sample pixel as said quantized sample pixel value; and output said sample pixel coding mode and said quantized sample pixel value as an output data.

In another aspect, a device adapted to process an image comprising a plurality of pixels is provided. The device includes a receiver, a pulse-code modulation module, and an adaptive quantization module. The receiver is adapted to receive a sample pixel of said image. The pulse-code modulation module is adapted to determine a quantized sample pixel value based on said received sample pixel. The adaptive quantization module is adapted to: determine a difference signal value based on said sample pixel and a predicted value of said sample pixel; determine a quantized difference signal value based on said difference signal value and a quantization parameter; determine a differential pulse-code modulation (DPCM) error based on deducting said quantized difference signal value from said difference signal value; determine a pulse-code modulation (PCM) error based on deducting said quantized sample pixel value from said received sample pixel; determine a range of values based on a number of coding bits and said quantization parameter; if said difference signal value is not within said determined range of values and if said PCM error is less than said DPCM error, then assign said sample pixel coding mode comprising one bit associated with said sample pixel to a mode indicating that said sample pixel is coded as PCM data; code said sample pixel as said quantized sample pixel value; and output said sample pixel coding mode and said quantized sample pixel value as an output data; otherwise, assign a sample pixel coding mode comprising one bit associated with said sample pixel to a mode indicating that said sample pixel is coded as DPCM data; code said sample pixel as said quantized difference signal; and output said sample pixel coding mode and said quantized difference signal as an output data.

In another aspect, a method of processing an image is provided. The method includes the steps of reading an input associated with a sample pixel of said image, said input comprising a coding mode and a coded data associated with said sample pixel, wherein said coding mode indicates whether said coded data is coded as a differential pulse-code modulation data (DPCM) or a pulse-code modulation (PCM) data; if said coding mode indicates that said coded data is DPCM data then constructing a pixel of said image based on said coded data and a predicted value of said sample pixel; and if said coding mode indicates that said coded data is PCM data then constructing a pixel of said image based on said coded data.

In another aspect, a device is provided. The device includes a receiver, a pulse-code modulation module, and an adaptive quantization module. The receiver is adapted to read an input associated with a sample pixel of an image. The input includes a coding mode and a coded data associated with said sample pixel, wherein said coding mode indicates whether said coded data is coded as a differential pulse-code modulation data (DPCM) or a pulse-code modulation (PCM) data. The pulse-code modulation module is adapted to construct a pixel of said image based on said coded data, if said coding mode of said read input indicates that said coded data is PCM data. The adaptive quantization module is adapted to construct a pixel of said image based on said coded data and a predicted value of said sample pixel, if said coding mode of said read input indicates that said coded data is DPCM data.

BRIEF DESCRIPTION OF THE DRAWINGS

The present invention is illustrated by way of example and not limitation in the figures of the accompanying drawings, and in which:

FIG. 6 lists an exemplary pseudo code of a coder embodiment applying an adaptive quantization process, according to an embodiment of the invention;

FIGS. 8A and 8B together list an exemplary pseudo code of another exemplary adaptive quantization process, according to an embodiment of the invention;

FIG. 9 lists another exemplary pseudo code of another coder embodiment applying an adaptive quantization process, according to an embodiment of the invention;

FIG. 10 lists an exemplary pseudo code of another adaptive quantization process that may be performed by another exemplary decoder, according to an embodiment of the invention;

FIGS. 14A and 14B together list an exemplary pseudo code of an adaptive quantization module embodiment of FIGS. 12, 13A and 13B, according to an embodiment of the invention;

DETAILED DESCRIPTION

Figure 1:
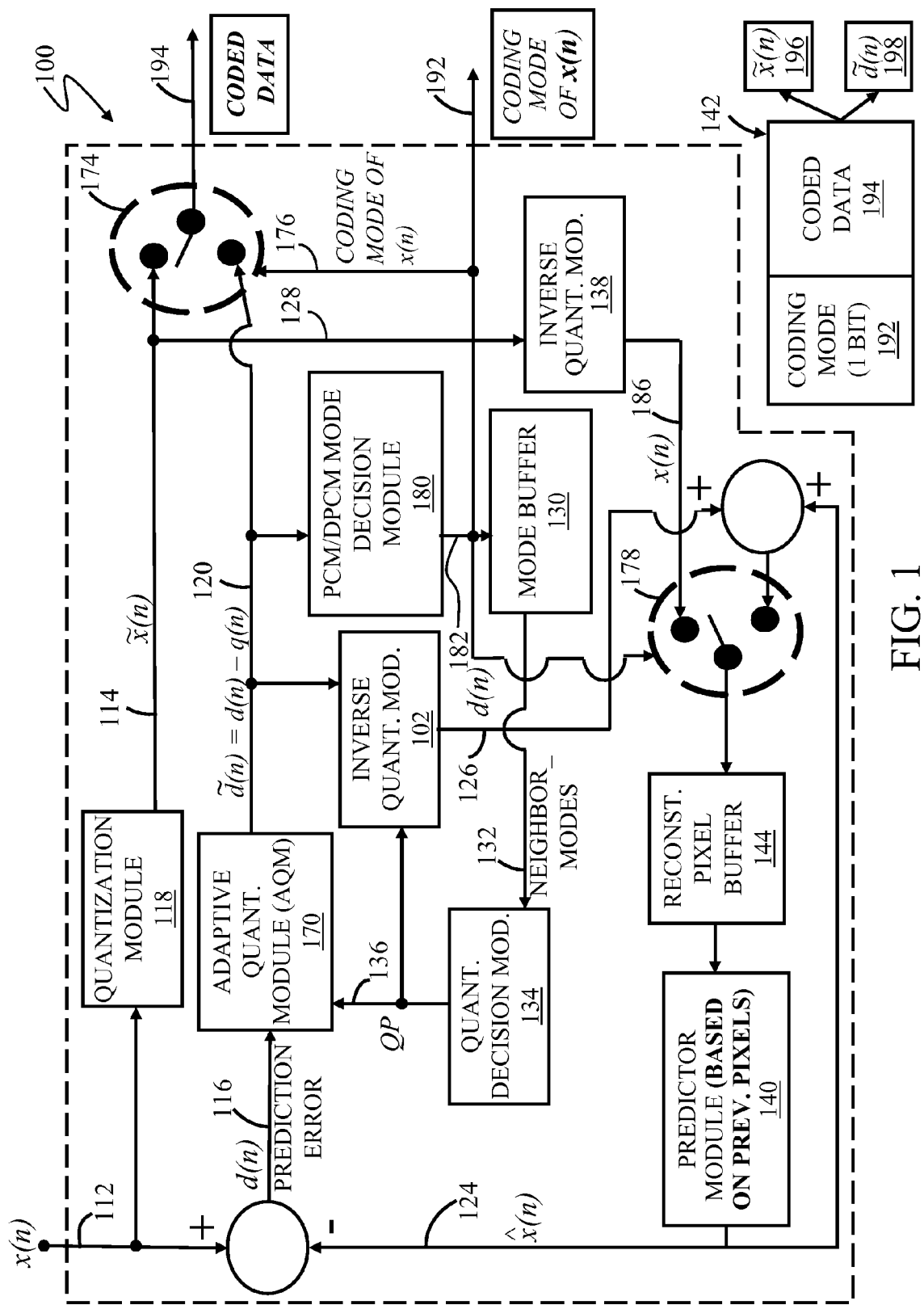
FIG. 1 is a high-level functional block diagram of a coding module adapted to perform adaptive quantization processes, according to an embodiment of the invention.
Figure 2:
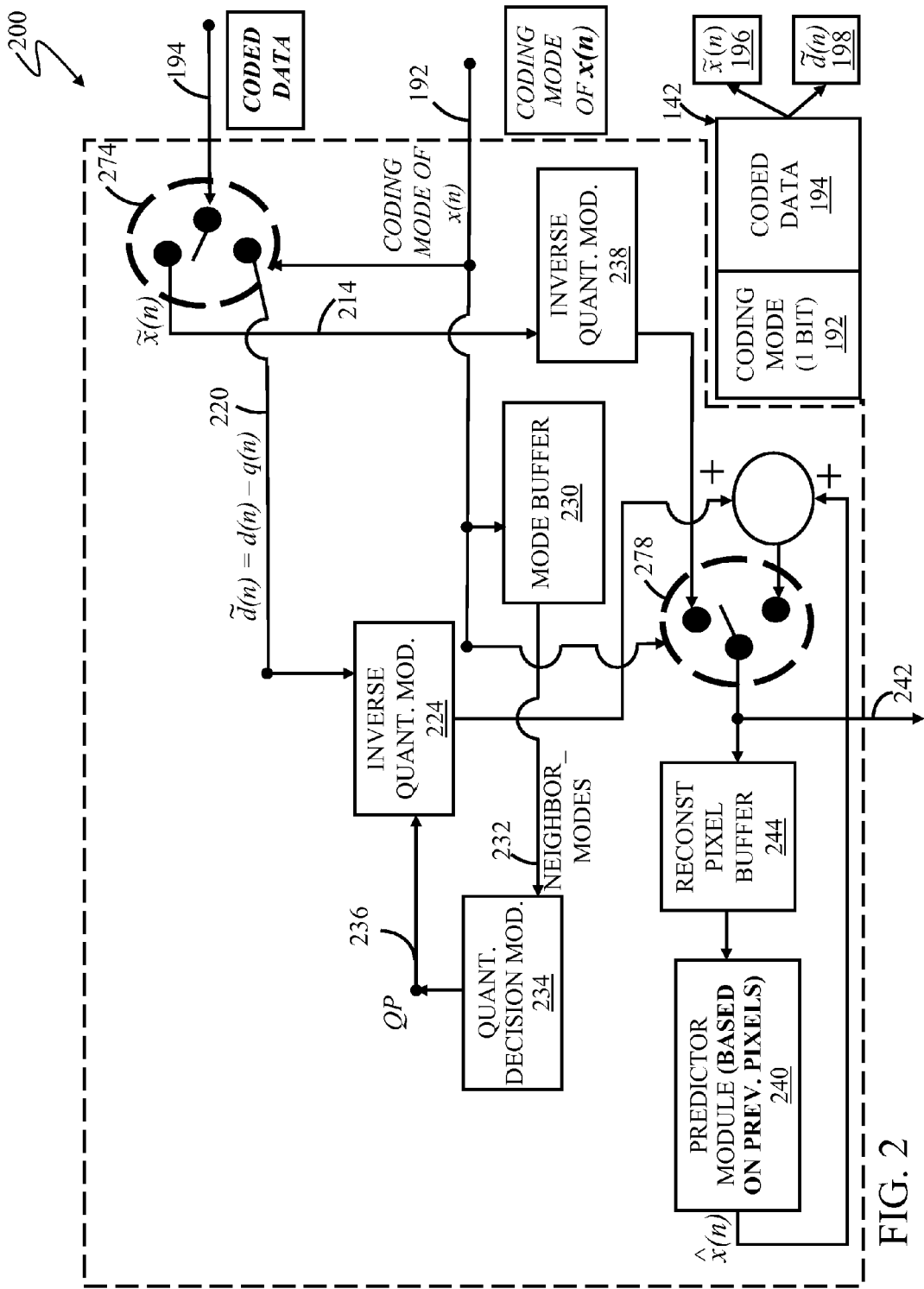
FIG. 2 is a high-level functional block diagram of a coding device adapted to receive the output of the adaptive quantization process of FIG. 1, and accordingly decode and/or reconstruct the output, according to an embodiment of the invention.

To better understand the figures, reference numerals within the one hundred series, for example, 100 and 142, are initially introduced in FIG. 1, reference numerals in the two hundred series, for example, 200 and 240, are initially introduced in FIG. 2, and so on and so forth. So, reference numerals in the nine hundred series, e.g., 902 and 904, are initially introduced in FIG. 9.

The embodiments of the present invention generally relate to data compression, particularly to image compression that applies to still images or frames, as well as video streams, which typically consist of a sequence of frames. The embodiments of the present invention may also apply to data compression of intra-coded images. The embodiments of the invention also particularly apply to image processing systems, devices, and methods, where images or frames are encoded into a frame buffer for further image processing, for example, for image enhancement and manipulation processing and/or high-definition image processing. The embodiments of the present invention may compress data and reduce data size prior to storing such data in the frame buffer, thereby potentially reducing the frame buffer size requirement. Data compression of the present invention thus typically reduces the memory size requirement, as well as the bandwidth requirement. The embodiments of the present invention may provide for a low-complexity, fixed compression ratio, and/or high quality compression devices, applications, and systems.

In some embodiments, an adaptive quantization process may be applied to code still or moving images. The still images or frames are each typically divided into pixels, and an adaptive quantization process is applied to code each pixel. A pixel, based on conditions, may be coded as pulse-code modulation (PCM) data or differential pulse-code modulation (DPCM) data. A coding mode identifier is typically transmitted between compatible coders, for example, between encoder and decoder modules to enable the decoder module to appropriately decode the received input data. Variations of the adaptive quantization methods, devices, and systems are described herein. In some embodiments, the encoder and decoder modules reside in the same image processing system or device. In some embodiments, an adaptive quantization method providing eight adaptive range modes or quantization steps, based on simulations, may provide one decibel (1 dB) of peak signal-to-noise ratio (PSNR) improvement over those that only provide for two quantization steps or adaptive range modes.

Pulse-code modulation (PCM), in one aspect, is generally a method of converting an analog signal into a digital signal. In another aspect, PCM may be applied to compress digital data. Differential pulse-code modulation (DPCM), on the other hand, is an extension of PCM. In general, DPCM is a procedure of converting a first signal into a second signal, in which the difference between the first signal and its predicted value is quantized and then encoded thereby forming the second value. The predicted value is typically based on one or more previously coded samples. In general, DPCM code words represent differences between samples, unlike PCM where code words represent a sampled value. In general, the embodiments of the present invention apply PCM and DPCM, with adaptive quantization, to reduce and/or compress digital data.

FIG. 1 is a block diagram of an exemplary coder module 100, which may be part of an image processing system or device, employing the adaptive quantization features of the present invention and the multi-coding feature of the present invention. The embodiments of the present invention generally code data pixel by pixel. In general, the exemplary coder module 100 may be adapted to perform PCM and DPCM processing with adaptive quantization. Each input sample may be coded as PCM data or DPCM data, based on defined conditions. Furthermore, the adaptive quantization process may be based on the coding modes of the neighboring pixels of the input pixel. The coding mode may indicate either PCM mode or DPCM mode For illustrative purposes, let us assume that the exemplary coder module 100 processes adjacent sample differences or [x(n)−x(n−1)], where x(n) 112 is the nth sample being processed by the exemplary coder 100 of the present invention. Let us further assume that each sample is a pixel and such pixel is represented in digital form. The exemplary coder module 100 is generally adapted to represent the input pixel as a representation with a lesser number of bits. For example, the coder module 100 may reduce the x(n) digital input 112 of ten bits to a coded data 194 of six bits.

Generally, in the PCM phase of processing, the digital input x(n) 112 is processed by a quantization module 118. Generally, the process of quantization relates to rounding off or approximating a value to one of the closest quantized levels. Described in another way, the input value x(n) 112 is quantized to one of N levels or steps. Each level or step is typically assigned a value and a code representing such value. The quantization module 118, for example, may provide six quantized steps. Other appropriate numbers of quantized steps may be employed and yet still be in the scope of the present invention. The output of the quantization module 118 is the quantized value of x(n), which may be represented as x̃(n) 114.

On the other hand, in the DPCM phase of processing, the input 116 to the adaptive quantization module (AQM) 170 is typically a prediction error or difference signal, d(n) 116, such that d(n)=x(n)−x̂(n), where x̂(n) 124 is a prediction of x(n) 112. The prediction value x̂(n) 124 may be generated by the predictor module 140. The prediction value may also be based on one or more previous input samples, e.g., x(n−1), x(n−2), . . . . The one or more previous input pixels may be neighboring pixels of the input pixel x(n), which may be previously reconstructed pixels stored in a reconstructed pixel buffer 144.

The difference signal or prediction error 116, d(n), represented by d(n)=x(n)−x̂(n), is quantized by the adaptive quantization module 170 based on a quantization parameter (QP) 136 to generate the quantized prediction error d̃(n) 120, where d̃(n)=d(n)−q(n) and where q(n) is the quantization error.

The PCM/DPCM mode decision module 180 is adapted to determine and assign the coding mode of the current pixel x(n) 176. The coding mode of x(n) may be assigned PCM mode or DPCM mode. Depending on the coding mode assigned to x(n) 176, the coded data 194 outputted by the coder module 100, for example, to a frame buffer for further image processing, is the quantized value of x(n)—i.e., x̃(n) 114 or the quantized difference signal or prediction error d̃(n) 120, as represented by the exemplary switch 174. The coding mode of x(n) is also typically outputted 192 by the exemplary coder module. The output 142 of the exemplary coder 100 thus includes the coding mode of x(n) 192 and the coded data of x(n) 194, which may be PCM data, i.e., the quantized input value—x̃(n) 114, 196 or DPCM data, i.e., the quantized difference signal/prediction error—d̃(n) 120, 198. In some embodiments, the coding mode is coded as one bit. For illustrative purposes, let us assume that a coding mode of "0" indicates DPCM mode—thus with an output of DPCM data, and a coding mode of "1" indicates PCM mode, thus with an output of PCM data. For decoding efficiency, the coding mode 192 may be outputted first then followed by the coded data 194. The output 142 may also be stored in the frame buffer, as exemplified in this figure.

The predictor module 140 may apply various prediction processes and/or algorithms. In some embodiments, the predictor module 140 applies linear prediction to obtain x̂(n) 124. This may be represented by $$\hat{x}(n) = \sum_{j=1}^{N} h_j \tilde{x}(n-j)$$

where H={$h_j$} and j=1, 2, . . . , N, which is a set of predictor coefficients. In some embodiments, the predictor module 140 may be an all-zero predictor module.

The quantized value of x(n), represented by x̃(n) 114, 128 may be inverse quantized 186 by an inverse quantization module 138 and then stored in the reconstructed pixel buffer 144 depending on the coding mode of x(n), as represented by the exemplary switch 178. Similarly, the quantized difference signal/prediction error 120, d̃(n), may be inverse quantized 126 by an inverse quantization module 102 and then stored in the reconstructed pixel buffer 144 depending on the coding mode of x(n), as shown by the switch 178. Depending on the setting of the switch 178, the appropriate pixel value, either as PCM data or DPCM data, may accordingly be stored in the reconstructed pixel buffer 144. The predictor module 140 bases its prediction value of x̂(n) from pixels stored in the reconstructed pixel buffer 144.

The coding mode of x(n) 182 assigned by the PCM/DPCM decision module 180 is accordingly applied to update the mode buffer 130. The mode buffer 130 in general contains the coding modes of previously coded and also reconstructed pixels or samples. These previously coded pixels may be neighboring pixels of the input pixel x(n). From the coding modes of previously coded pixels 130, the neighbor_modes value 132 is applied by the quantization decision module 134 to obtain a quantization parameter, QP, 136 which may then used by the AQM 170 or by the inverse quantization module 102.

FIG. 2 is a block diagram of an exemplary decoder module 200 compatible with the exemplary coder module 100 of FIG. 1. The exemplary decoder module 200 is adapted to receive or process the output 142 of the coder module 100 and accordingly reconstruct the received output, so as to appropriately reconstruct the sample x(n) 112 of FIG. 1. One of ordinary skill in the art will appreciate that a compatible decoder module performs typically the same functions as its compatible coder module 100.

Continuing the discussion from FIG. 1, let us assume that the output 142, with the coding mode 192 and coded data 194, is received error-free by the exemplary decoder module 200. The received coding mode of x(n) 192 is applied to update the mode buffer 230. Similar to the mode buffer 130 of the coder module, the mode buffer 230 of the decoder module contains the coding modes of previously coded/reconstructed samples or pixels. This process updates the mode buffer by storing the coding mode of the pixel currently being processed. Based on the coding modes of the appropriate number of previously coded pixels, the neighbor_modes value 232 is determined and applied by the quantization decision module 234 so as to determine the appropriate QP 236 to be applied by the inverse quantization module 224.

Furthermore, based on the received coding mode 192, the received coded data 194 is accordingly processed as PCM data or DPCM data as represented by the exemplary switch 274. If the coding mode 192 is set to PCM mode, the coded data 194, which is a PCM data 214, is inverse quantized by an inverse quantization module 238, which may then be stored in a reconstructed pixel buffer 244, depending on the coding mode 192, 278. If the coding mode 192 indicates DPCM mode, the received coded data 194, which is a DPCM data 220, is accordingly inverse quantized by an inverse quantization module 224 based on the appropriate QP 236. In general, if the decoder module receives DPCM data indicated with a DPCM coding mode, the output 242 of the exemplary decoder module 200 is generally based on adding the received DPCM coded data of $\hat{d}(n)+\hat{x}(n)$, as shown by the arrow 244. IF the decoder module received PCM data indicated with a PCM coding mode, the output 242 is generally PCM data, e.g., $\tilde{x}(n)$.

Figure 3B:
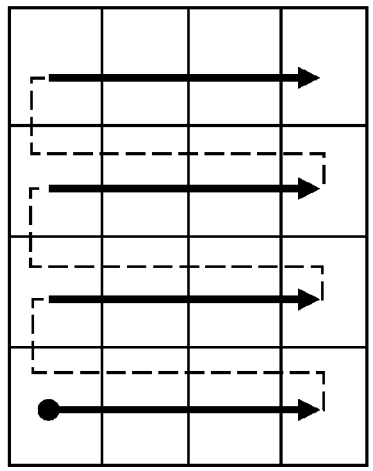
FIGS. 3A, 3B, and 3C illustrate exemplary patterns illustrating exemplary manners in which an image may be processed pixel by pixel, according to an embodiment of the invention.
Figure 3C:
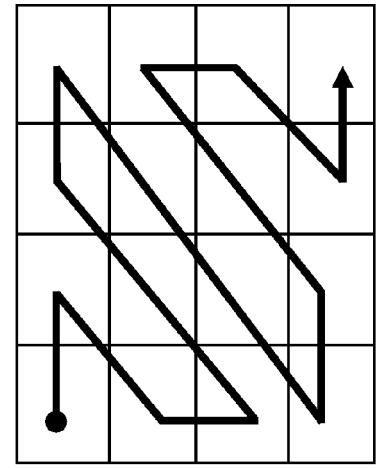
Figure 3A:
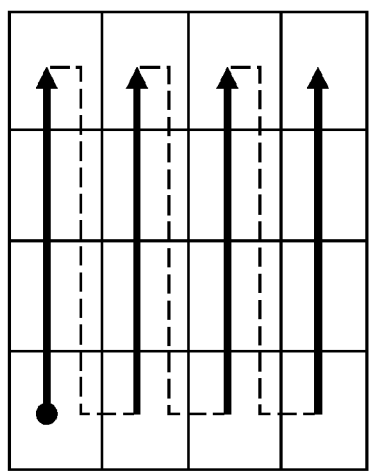

FIGS. 3A, 3B, and 3C illustrate exemplary patterns illustrating exemplary manners in which an image may be processed pixel by pixel. FIG. 3A shows an image being processed in a horizontal raster scan pattern. FIG. 3B shows an image being processed column by column, such as a vertical raster scan pattern. FIG. 3C shows an image being processed in a zigzag scan pattern. In general, an image may be processed line by line or frame by frame. Other embodiments of processing an image pixel by pixel may be applied and yet still be in the scope of the present invention.

Figure 4:
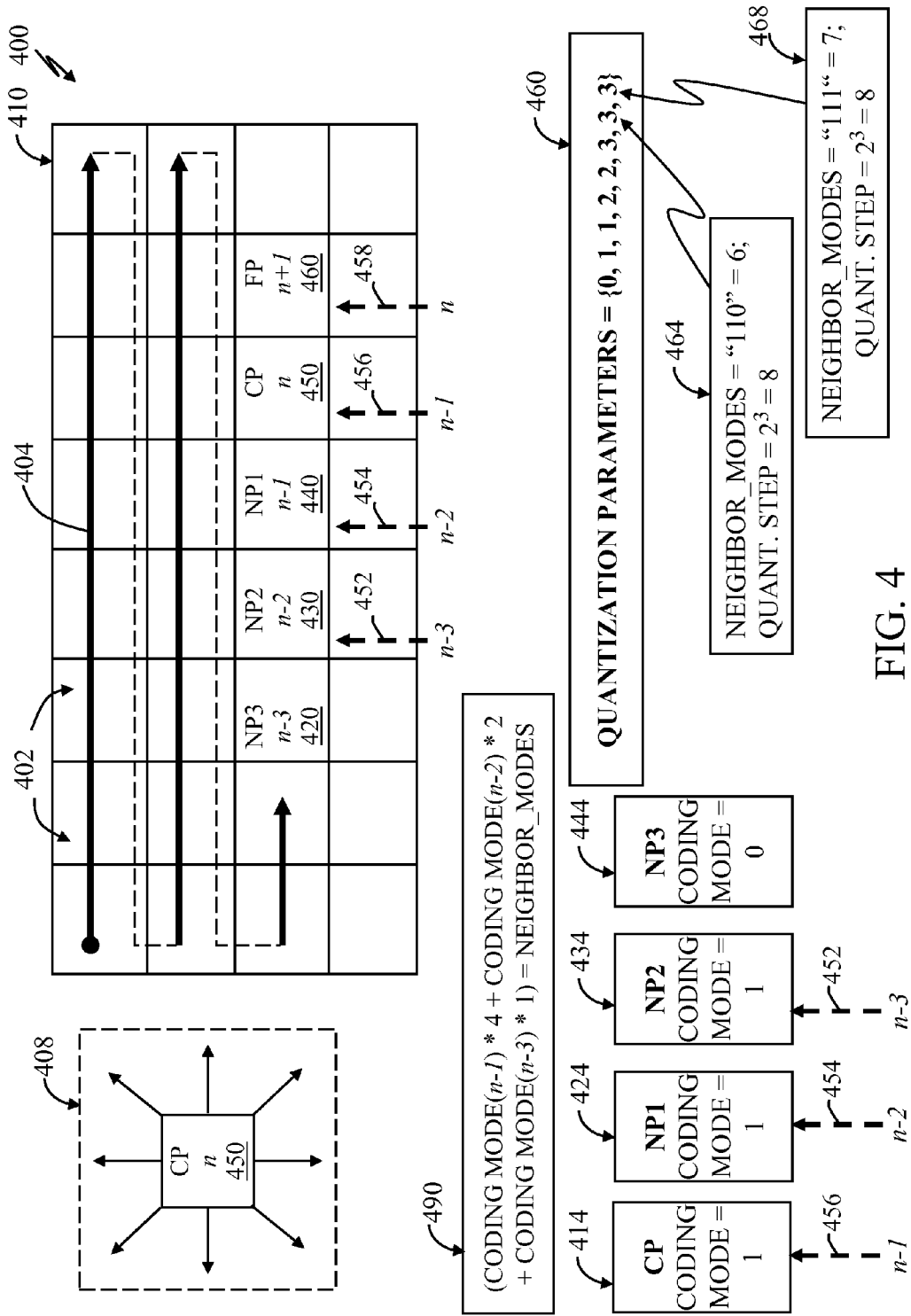
FIG. 4 is a high-level diagram representing a portion of an exemplary image being intra-coded, and with associated exemplary values, including quantization parameters, according to embodiments of the invention.

FIG. 4 is a high-level diagram 400 representing a portion of an exemplary image 410 being intra-coded, and with associated exemplary values, including neighbor_modes values, according to embodiments of the present invention. Each exemplary pixel is represented, for example, by a square 402. Let us assume that the current or input pixel being processed is pixel n 450, herein also referred to as the current pixel (CP) 450. The next pixel to be processed, n+1 460, after coding of the CP, is labeled as the future pixel (FP) 460. The manner of processing the pixels illustrated in FIG. 4 is for exemplification purposes only. One of ordinary skill in the art will appreciate that the order of processing pixels of an image may be varied and yet still be in the scope of the present invention.

In an exemplary embodiment, the coder module 100, or similarly the decoder module 200, keeps track of the coding modes of the three most recently processed or reconstructed pixels, e.g., pixel n−1 (NP1) 440, pixel n−2 (NP2) 430, and pixel n−3 (NP3) 420, for example, via a mode buffer 130, 230. In some embodiments, the previous pixels are neighboring pixels, which may be proximate or adjacent to the input or current pixel being processed. The neighboring pixels may be proximate or adjacent from various directions as shown in the exemplary diagram 408.

Although the exemplary embodiment herein is discussed in relation with the three most previously coded/reconstructed pixels 420, 430, 440, variations on the number of pixels may be applied and yet still be in the scope of the present invention. For example, only the most recently coded/reconstructed pixel may be applied—i.e., only one previous pixel, or the five most recently coded/reconstructed pixels may be applied to determine the neighbor_modes in order to determine the QP to be applied. Furthermore, the exemplary embodiments discussed herein typically have the predictor module 140, 240 calculate the predicted error x(n) based on the most previous input sample, i.e., x(n−1). The predictor module 140, 240 of the present invention may be adapted to determine or calculate the predicted error based on more than one previously coded sample, which may be obtained or accessed, for example, from a reconstructed pixel buffer 144, 244.

In some embodiments, the mode buffer 130, 230 contains only the coding modes of previously coded/reconstructed pixels that are applied to define the neighbor_modes parameter or variable. In other embodiments, the mode buffer 130, 230 may contain more coding modes than needed to define the neighbor_modes, i.e., there are coding modes that are not needed to define the current neighbor_modes. In embodiments, where there are more coding modes as related to defining the neighbor_modes, the quantization decision module 134, 234 or another module may be designed to be adapted to only retrieve the appropriate coding modes.

Based on the mode buffer 130, 230, which contains the coding modes of previously coded and reconstructed pixels, a neighbor_modes value is determined which may then be applied by the quantization decision module 134, 234 to determine the QP 136, 236. Described in another way, the QP is based on a neighbor_modes value 132, 232, which is generally obtained from the coding modes of one or more previously coded/reconstructed neighboring pixels. In this embodiment, the quantization parameters or QPs of an exemplary embodiment are shown listed with the following values: {0, 1, 1, 2, 2, 3, 3, 3}. This list of QPs may be embodied in various forms, such as defined programmatically as part of the logic of a set of program instructions, e.g., hard-coded in software, may be implemented as one or more memory variables, such as a table, array, and/or data structure, or in other ways known to those of ordinary skill in the art. The one or more QPs are typically defined in the coder 100 and decoder 200 modules.

In this example, there are eight adaptive range modes or quantization steps that may be derived—as exemplified. Considering that there are three bits, these three bits may represent up to eight QPs and accordingly eight quantization steps. In this example, the QPs in general indicate the power or exponent to which the base, in our example, 2 is to be raised, thereby defining the quantization step. One of ordinary skill in the art, however, will appreciate that the QP may directly contain the quantization step value itself rather than just the exponent part.

Table I below shows the exemplary QPs 460 of FIG. 4, and their associated neighbor_modes and quantization step values.

TABLE I

Exemplary Quantization Steps

| Neighbor_Modes bits (decimal) | Quantization Parameter | Quantization Step |
|---|---|---|
| "000" = (0) | 0 | $2^0 = 1$ |
| "001" = (1) | 1 | $2^1 = 2$ |
| "010" = (2) | 1 | $2^1 = 2$ |
| "011" = (3) | 2 | $2^2 = 4$ |
| "100" = (4) | 2 | $2^2 = 4$ |
| "101" = (5) | 3 | $2^3 = 8$ |
| "110" = (6) | 3 | $2^3 = 8$ |
| "111" = (7) | 3 | $2^3 = 8$ |

To determine the coding modes of previous pixels, the coding mode of each of the previous three pixels for this example is applied, e.g., via bit concatenation, so as to determine or define the QP and/or the quantization step. For example, let us assume that each of the previous pixels NP1 440, NP2 430, and NP3 420 has its coding mode set to "1" (PCM) 424, "1" (PCM) 434, and "0" (DPCM) 444, respectively. Each coding mode is concatenated so as to determine the QP. The concatenation of the coding modes, in this example, is "110"–"1" 424+"1" 434+"0" 444, with the most previous pixel, n–1 440, 424, as the most significant bit. The binary "110" is equal to "6" in decimal and results to a QP of "3" and a quantization step of "8," as shown in Table I above and in the FIG. 464. In other embodiments, the neighbor_modes value may be obtained by performing the following calculation 490: (coding mode(n–1)*4+coding mode(n–2)*2+coding mode(n–3)*1), where (n–i) denotes the coding mode of the previous ith pixel.

Let us further assume for illustrative purposes that the coding mode of the current pixel n 450—i.e., coding mode(n), after performing the adaptive quantization process of the present invention, is assigned the value of "1" (PCM) 414. At the next pixel processing, the next pixel FP 460 is now the current pixel n 458, the previous CP 450 is now the previous pixel (n–1) 456, the previous NP1 440 is now the previous pixel (n–2) 454, and the previous NP2 430 is now the previous pixel (n–3) 452. The QP from such coding modes 468 is "111," which is "7" in decimal, and results in a QP of "3" and a quantization step of "8" as shown in Table I and by the figure. The embodiments of the present invention thus utilize the coding modes of one or more previously coded/reconstructed pixels to define the neighbor_modes to obtain the appropriate QP, including the quantization step. A different number of previous pixels, for example, four previous pixels may define up to sixteen possible quantization steps. Such variations are still within the scope of the present invention.

In other embodiments, if the AQM is based only on one previous pixel, such information may be tracked by setting an appropriate flag, for example, a one-bit flag which is associated to keep track of a previous reconstructed pixel. The flag, for example, may be set to "1" to indicate that the previous pixel is assigned a PCM coding mode or to "0" indicating PCM mode.

Figure 5:
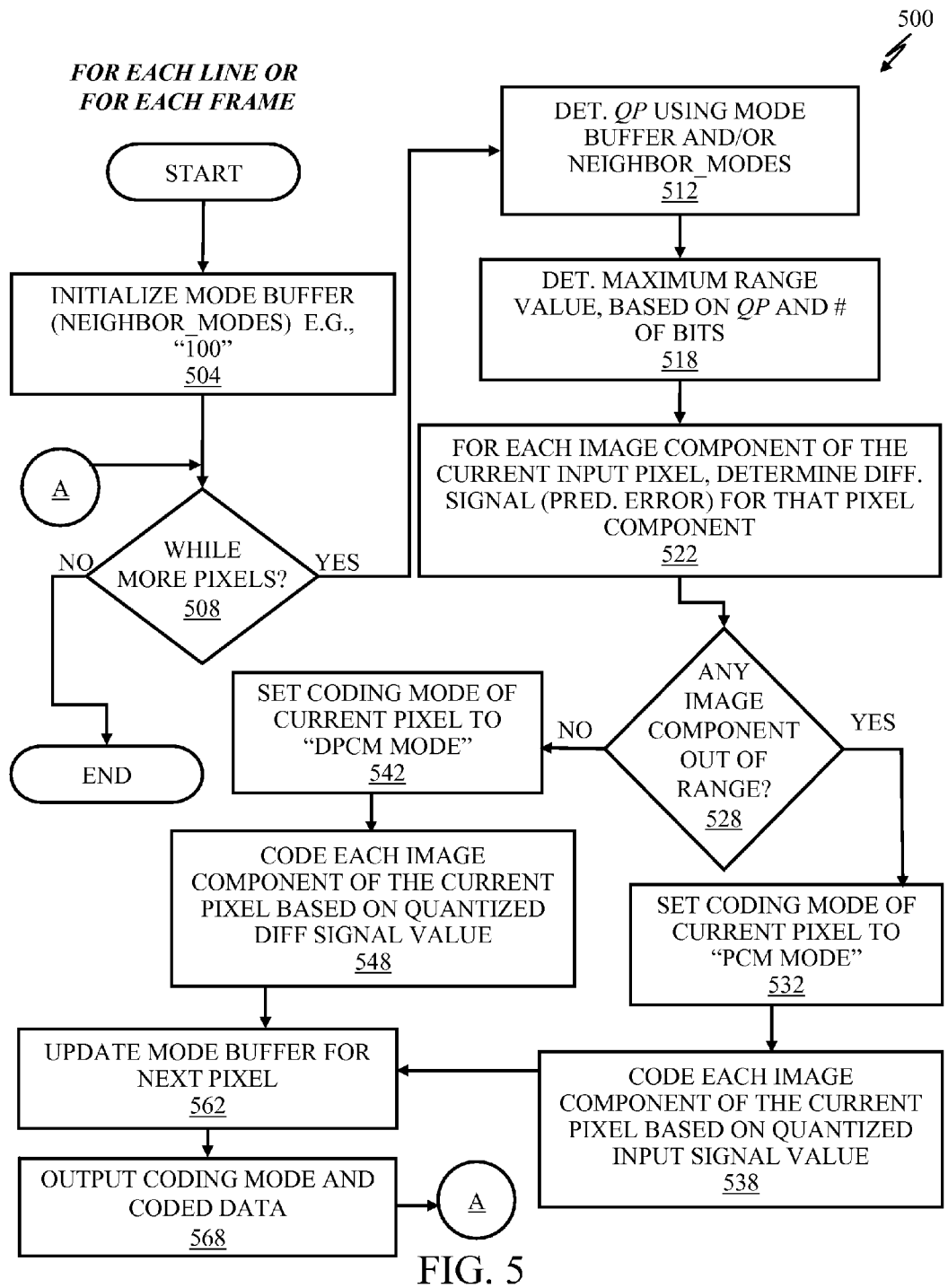
FIG. 5 is an exemplary flowchart of an exemplary adaptive quantization process, according to an embodiment of the invention.

FIG. 5 is an exemplary high-level flowchart of an exemplary adaptive quantization process 500 generally performed by the coder module 100, according to an embodiment of the present invention. One of ordinary skill in the art will appreciate that an image may be processed line by line or frame by frame, or by other image size delineation. Generally, this exemplary adaptive quantization process is applied for each line or for each frame, typically based on the implemented manner of processing the image. Furthermore, in this example, the input image is processed pixel by pixel. In this exemplary embodiment, each pixel or input is defined to be compressed to i number of bits, for example, five bits. The QP of the PCM data may also be defined.

Assuming this flowchart is applied per frame, in the first operation, an initialization process is performed for such a frame, for example, (step 504). Considering that the mode buffer 130 may be empty at this point, an initialization of the neighbor_modes parameter or variable may be appropriate. The mode buffer 130 and/or the neighbor_modes may be initialized to an appropriate value, e.g., "100" representing three previously coded pixels. The initialization value may be based on the number of previous pixels that influences the number of QPs and/or quantization index, and/or the value of the neighbor_modes. While there are more pixels to be processed, for example, for that frame (step 508, "yes" branch), the adaptive quantization process determines the QP, which may include the quantization step, to apply based on the neighbor_modes, derived from the coding modes of the appropriate number of previous pixels (see FIG. 4, for example) (step 512). The mode buffer 130 as explained herein typically contains the coding modes of previous pixels defining the neighbor_modes.

Based on the determined QP, quantization step, a maximum range value is determined (step 518), which may be based on the number of coding bits and/or the QP. This maximum range value may be applied to determine if a value is out of range, e.g., there is an overflow or and underflow, e.g., an arithmetic overflow or underflow. Then, for each image component of the current input pixel, the adaptive quantization process determines the difference signal or predicted error for that image component of the current pixel (step 522). The maximum range value may be applied to determine a maximum positive value and a minimum negative value, for example. An image may have one or more image components, and in this example, a number of pixels. Each pixel, if it is a color pixel, may have three image components, e.g., red (R), green (G), and blue (B) components. In some embodiments, the image components of a pixel may be various level of grays or may be cyan (C), magenta (M), yellow (Y), and black (K) components.

If any of the difference signal/predicted error associated with any of the image component is out of range of the determined appropriate range of values, i.e., the value of the difference signal may cause an overflow or an underflow because such value may not be accurately represented in the appropriate number of coding bits defined or allocated within the system (step 528, "yes" branch), the adaptive quantization process sets the coding mode of the current pixel, coding mode(n), to "PCM" mode or "1" (step 532). The current pixel is then accordingly coded as PCM data, i.e., coded as a quantized input signal value, $\tilde{x}(n)$ (step 538). On the other hand, if no image component of the current pixel causes an overflow (step 528, "no" branch), the coding mode of current pixel is set to "DPCM" mode or "0" (step 542) and the current pixel is accordingly coded as DPCM data, i.e., as a quantized difference signal or prediction error, $\tilde{d}(n)$ (step 548). The mode buffer 130 and/or neighbor_modes value is accordingly updated with the coding mode of the current pixel, in preparation for the next input pixel to be processed (step 562). The coding mode of the current pixel 192 and the coded data 194, e.g., $\tilde{x}(n)$ or $\tilde{d}(n)$, are then accordingly outputted (step 568), e.g., stored in a frame buffer for further image processing. The steps are then repeated for the rest of the pixels for that frame. The mode buffer and/or neighbor_modes value applied for each iteration is based on one or more previous pixels of that pixel being processed.

FIG. 6 lists an exemplary pseudo code 600 of a coder module applying the adaptive quantization process of an embodiment of the invention. The exemplary pseudo code 600 was converted to a set of program instructions and tested. Furthermore, the images tested each included a plurality of pixels, with each pixel having three image components, particularly color components—red (R), green (G), and blue (B). Each color component was represented, uncompressed, with ten bits, thus a pixel with RGB components was represented with thirty bits. The exemplary embodiment of the present invention, represented by the exemplary pseudo code 600, may be adapted to compress these three color components into a total of sixteen (16) bits, thus having a compression ratio of 30/16 or 1.875. The predictor module 140 of this exemplary embodiment based its prediction error/difference signal calculation on one previous sample. The exemplary pseudo-code is for illustrative purposes only; variations are expected and will still be in the scope of the present invention.

To further explain the exemplary pseudo code 600, the parameters below generally represent the following:

a) BitsSent: Number of coding bits allocated for each data or input sample component. In this example, 5 coding bits are allocated. For the PCM mode, because the expected values are all positive numbers, hence, all 5 bits are applied to represent and code the input sample or pixel. For DPCM mode, the values are represented as two's complement, thus one bit is allocated as a sign bit, while the other four bits are allocated to store the value.

b) current_flag: Flag indicating the coding mode of the current input pixel, e.g., coding mode of x(n). In general, the current_flag represents the coding mode of the current input sample and may contain the value of "1"/PCM mode or "0"/DPCM mode. Typically, the current_flag is allocated one bit.

c) Quant: Quantization Parameter, where the quantization step size is defined as $2^{Quant}(=2^\wedge Quant)$.

d) Current_Data$_{color}$: Color component of the current input pixel, e.g., x(n), where color may be, in this example, R, G or B.

e) Previous_Data$_{color}$: Color component of the previous pixel, e.g., x(n−1), where color may be, in this example, R, G or B. Previous_Data$_{color}$ is typically a predicted value, e.g., $\hat{x}(n)$ (see FIG. 1, 124) of that color component.

f) D$_{color}$: Difference signal or prediction error between Current_Data$_{color}$ and Previous_Data$_{color}$, e.g., d(n). Typically, Current_Data$_{color}$ may be the input sample value of that color component, while the Previous_Data$_{color}$ may be a predicted value.

g) OutOfRange$_{color}$: Flag indicating if difference signal/prediction error of that color component, D$_{color}$, is out of range, e.g., an overflow or underflow may occur considering there may not be enough bits to correctly contain the value of D$_{color}$, and where color may be, in this example, R, G or B.

h) QuantTable: In this exemplary embodiment, the QPs are defined via an exemplary Quantization Table, where QuantTable[ ]={0, 1, 1, 2, 2, 3, 3, 3}. As mentioned above, other processes and/or other software engineering techniques may be applied to perform the functions and/or features of a table, such as programmatically define such QPs as part of program logic, for example.

i) neighbor_modes: The value based on the coding modes of previous pixels (see FIG. 4).

Referring to the exemplary pseudo-code, the mode buffer and/or neighbors_modes is initialized to "4" (decimal) or "100," i.e., one bit for each previous pixel. Based on the neighbor_modes 604, the QP, represented by Quant, is obtained 606. The neighbor_modes is based on three previously coded neighboring pixels.

The exemplary pseudo code 600 is adapted to code the input sample, x(n), as a coded data 194, e.g., d(n) or $\tilde{x}(n)$, with five bits, for example, as defined by the BitsSent variable 602. The output coded data 194, however, may be coded and/or outputted with a different number of bits, based on compression considerations. The images or input samples that may be processed by this exemplary pseudo code 600 may include those images containing pixels with three image components, particularly color components—red (R), green (G), and blue (B). The neighbor_modes 604, may be based on, for example, the combination of the coding modes of the appropriate number of previous pixels or based on a formula that applies the coding modes of the previous pixels, e.g., as exemplified and discussed above, including FIG. 4. These previous pixels are typically neighboring pixels in the causal area. In general, the QPs of the present invention may be determined by empirical data or by other means known to those of ordinary skill in the art.

In general, for each input pixel or input sample, the adaptive quantization process, exemplified by the pseudo code 600, performs several operations. In general, for each pixel, the QP is determined based on the neighbor_modes 604, 606. Once the QP is determined based on the set of available QPs, the appropriate range of values may be determined 612, by determining an absolute maximum absolute value, MaxABS. MaxABS, in general, may also define a minimum absolute value. The MaxABS variable may be based on the number of bits allocated for coding, BitsSent, and the QP—Quant.

The adaptive quantization process 600 also determines if any difference signal or prediction error value of any of the image components is out of range or may cause a data overflow or underflow, and accordingly sets the out of range flag 616. The out of range check is generally based on the MaxABS 612, and generally checks to determine if any difference value of any image component, D$_{color}$, may not be appropriately coded in the allocated number of bits. If the difference signal of the image component exceeds the appropriate range values, i.e., the value exceeds the maximum value or is less than the minimum value, the out of range flag is accordingly set 616.

In general, if any of the out of range flags, OutOfRange$_{color}$, associated with any image component is set, the current_flag associated with the current input sample is set to "1" indicating the PCM mode and that the output data is PCM data 620. On the other hand, if none of the out of range flags is set, the current_flag is set to "0"/DPCM mode and the output, particularly the coded data 194, is coded as DPCM data 622, e.g., d(n). The coding mode of the current input sample or pixel, represented by the current_flag, is written, e.g., in a frame buffer.

The exemplary adaptive quantization process 600 then codes the input sample 628 based on the current_flag. If the current_flag is set to PCM mode, the coded data output of this color component is the PCM data, which is the quantized input sample, e.g., $\tilde{x}(n)$ of the current data, with an optional rounding 634 and/or overflow/underflow protection 642 process. Otherwise, if the current_flag is set to DPCM mode, the coded data output of this color component is the DPCM data, which is the quantized prediction error/difference signal, e.g., $\tilde{d}(n)$ of the current data, with an optional rounding 638 and/or overflow/underflow protection 648 process. The rounding option 634, 638, in general, rounded the values up, thus underflow checking is generally not necessary. Other rounding processes may also be applied. The exemplary adaptive process 600 also updates the neighbor_modes and/or the mode buffer 650, in preparation for the next samples, e.g., pixels, that are to be processed. This exemplary process may be performed based on per frame/image or per lines of the image/frame.

Figure 7:
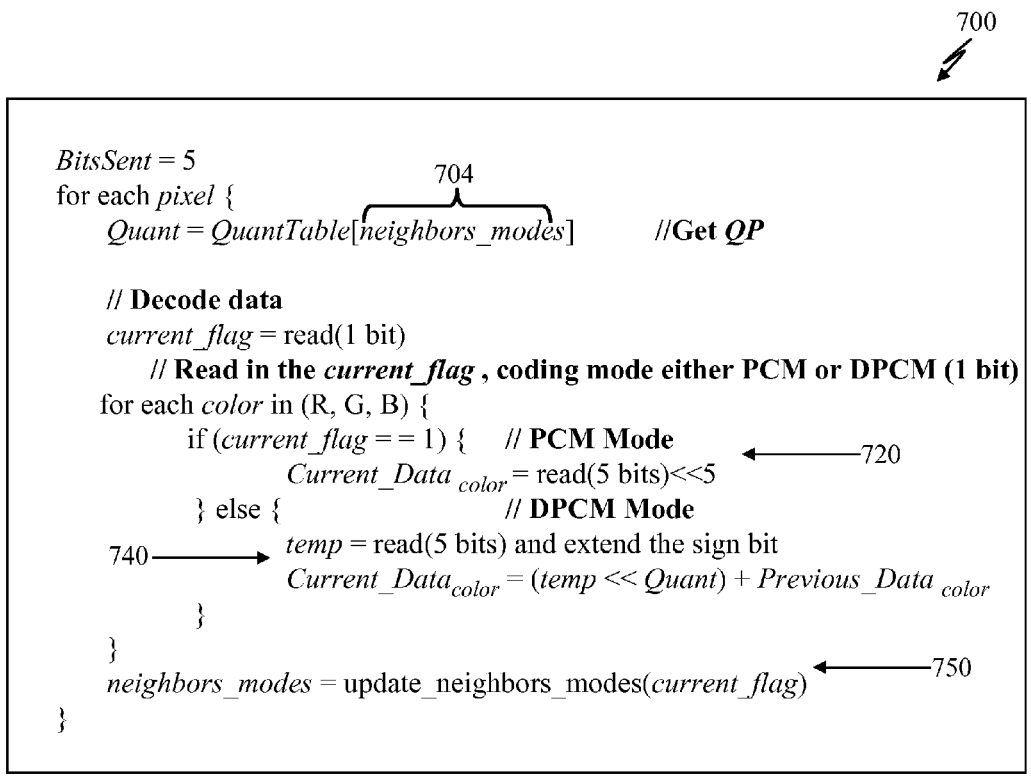
FIG. 7 lists an exemplary pseudo code of an adaptive quantization process that may be performed by an exemplary decoder, according to an embodiment of the invention.

FIG. 7 lists an exemplary pseudo code of an adaptive quantization process 700 that may be performed by an exemplary decoder module adapted to be compatible with the exemplary coder module of FIG. 6, according to an embodiment of the invention. The exemplary decoder module is adapted to receive the output of the exemplary coder embodiment of the present invention. The coder output is typically the decoder's input. The decoder sample input may accordingly be decoded or constructed. To be compatible, the number of coding bits, BitsSent, is known by both the coder 600 and the decoder 700 modules. The current_flag associated with the coding code of the received input is first read to determine if the coded data received is PCM data or DPCM data. The appropriate QP is also determined based on the neighbor_modes of the pixel currently being processed 704. If the current_flag is set to PCM mode, the decoder accordingly processes the input coded data as PCM data, e.g., x(n) 720, otherwise, the decoder module processes the input coded data as DPCM data, e.g., $\tilde{d}(n)$ 740. The neighbor_-modes and/or mode buffer is also accordingly updated 750, so as to be compatible with the coder module.

FIGS. 8A and 8B together list another adaptive quantization process exemplified by another exemplary pseudo code 800A, 800B of the present invention. This exemplary pseudo code or adaptive quantization process 800A, 800B is similar to that in FIG. 6, with some variations. Differences between the exemplary process in FIG. 6 and FIGS. 8A-8B are discussed and may be illustrated by the exemplary pseudo-code 800A, 800B.

Similar to the embodiment in FIG. 6, the coding mode is switched from DPCM mode to PCM mode when the calculated prediction error/difference sample is not within the appropriate range of values. In some embodiments, switching the coding mode from DPCM mode to PCM mode may result in the quantization step being increased significantly. But in some embodiments, the difference signal/prediction error may just be a little bit out of range of the maximum and minimum values. In these exemplary embodiments, when the difference is just a little bit out of range for the DPCM mode, the quantization error of the PCM mode—e.g., the quantization error from the input signal, may still be significantly larger than that of the maximum or minimum representation of the DPCM mode. Furthermore, in some embodiments, once the coding mode is switched to PCM mode, the adaptive quantization process may have to process and code several input samples or pixels before the coding mode may be switched back to the DPCM mode with a finer quantization step size, which may cause quality degradation of the decoded images.

In this other exemplary embodiment, the adaptive quantization process, represented in the pseudo code 800A, 800B, provides for an extended range of values for the DPCM mode, as compared to FIG. 6, to potentially improve the quality of decoded images for some embodiments. This exemplary process, in general, enables or allows some DPCM calculation that is a little over than the original range, via an ExtendedRange parameter. By providing an extended range 818, ExtendedRange, the maximum value that may contain the representation of the DPCM, e.g., 2 BitsSent−1−1, is extended or enlarged by an ExtendedRange amount, while the minimum DPCM representation, e.g., −2 BitsSent−1, is extended by an amount of −ExtendedRange. By providing an extended range 818, the difference sample is more likely not to exceed the appropriate range of values, thereby lessening the chances of the OutofRange being set to "1," and accordingly lessening the chances of the coding mode of the current input sample, i.e., the current flag, being set to the PCM mode 826. The ExtendedRange value, for example, may be around or equal to the mean absolute quantization error for the PCM mode, which is about 2QuantPCM−2, if we assume that the quantization error is uniformly distributed. In some embodiments, avoiding the coding mode to be set to PCM mode may avoid large quantization step sizes for several subsequent pixels or input samples to be processed. The ExtendedRange value may also be slightly larger than 2QuantPCM−2. The ExtendedRange value may also be determined by other means, e.g., by empirical studies. In this example, the QP for the PCM mode, QuantPCM, 802 is also defined as shown.

The difference signal/prediction error 822, in this embodiment, is rounded up 822, as compared to FIG. 6, 616. Furthermore, the DPCM coded data is outputted 852, 856 with no more rounding option. The coded PCM data 858 is outputted similar to that in FIG. 6, 634. These two lines 634, 858 perform generally the same function. The QP of the PCM mode in FIG. 6 is also five, similar to that in FIG. 8A 802, 634, 858. The DPCM coded data is also checked for underflow protection 856. These overflow and underflow protection processes, as mentioned above, ensure that the coded data is not out of range or may not be appropriately contained in the allocated number of coding bits.

Note that a decoder module compatible with the coder module of FIGS. 8A and 8B may be similar or the same as the decoder module exemplified and discussed in FIG. 7. In general, little or no modifications of the exemplary decoder may have to be performed.

FIG. 9 is an exemplary coder embodiment of another adaptive quantization process 900, according to an embodiment of the invention, similar to FIG. 6, but in this example, the neighbor_modes is based on only the most recently coded/reconstructed pixel, i.e., the neighbor_modes is based only on one pixel. Furthermore, the exemplary embodiment of FIG. 9 provides no out of range protection, e.g., overflow and/or underflow, similar to FIG. 6 642, 648. The exemplary neighbor_modes values of FIGS. 6-8B are exemplified herein via a previous_flag field 902. The previous_flag is the flag for the coding mode of the previous pixel. Because the neighbor_modes/previous_flag is only based on one pixel, this adaptive quantization process provides for two adaptive range modes. This exemplary embodiment has been tested to compress a 30-bit RGB pixel to 16-bits, similar to the above examples. In this example, if the coding mode of the previous pixel is the PCM mode 902, e.g., previous_flag==0, the quantization step is set to zero 904, otherwise the quantization step is set to two 908.

FIG. 10 is another exemplary decoder embodiment 1000 similar to FIG. 7, but adapted to be compatible with the embodiment of FIG. 9. The neighbor_modes or previous_flag of the exemplary coder and decoder embodiments in FIGS. 6-10 may be initialized to the appropriate value at the beginning of each image line or per frame, for example.

Figure 11:
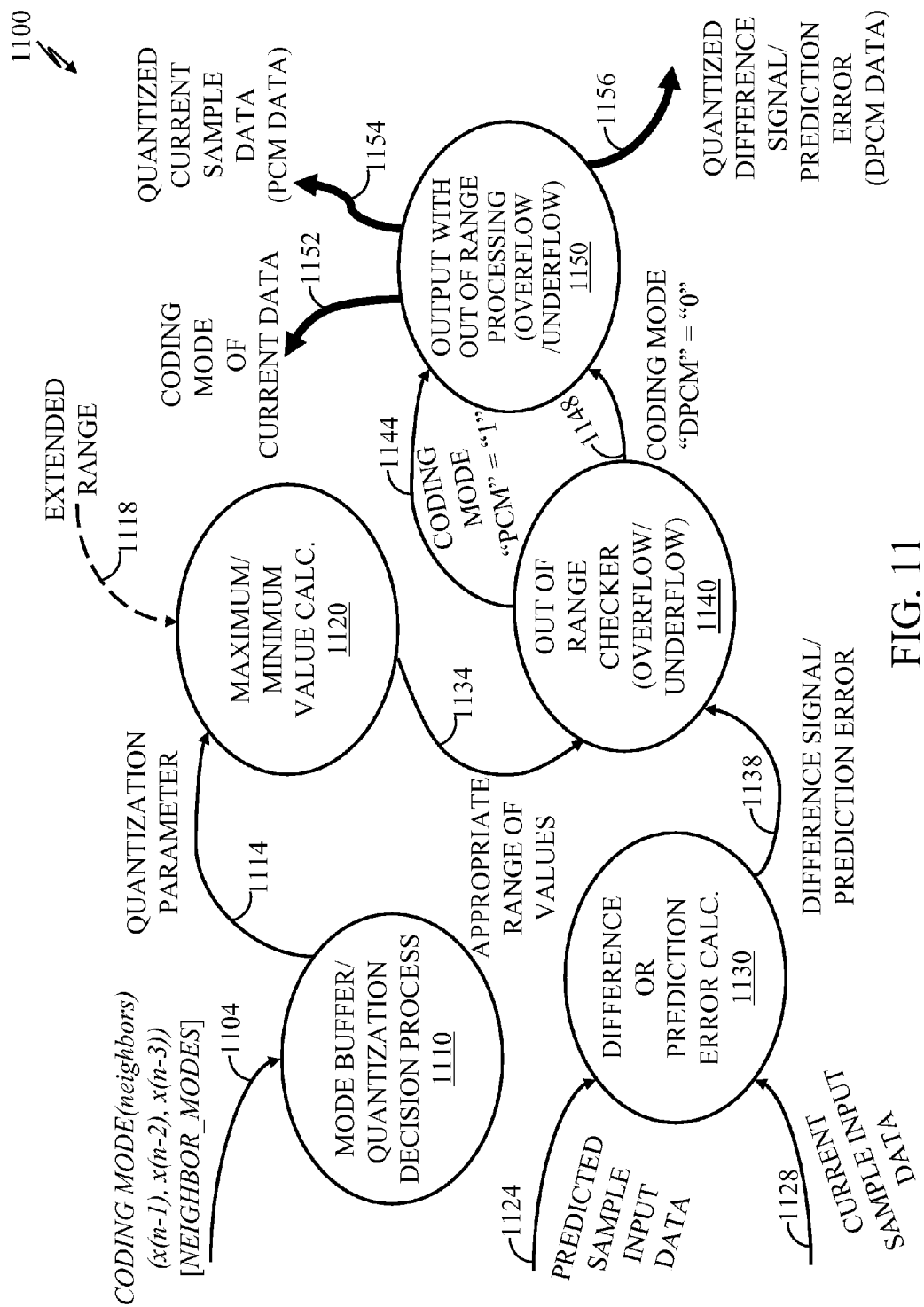
FIG. 11 is a diagram of an exemplary data flow, with exemplary processing modules performing certain functions, according to embodiments of the invention.

FIG. 11 is a diagram of an exemplary data flow 1100, with exemplary processes, according to the adaptive quantization embodiments of the present invention. The coding modes of one or more previous pixels are maintained, e.g., recorded, so as to determine the appropriate QP, particularly for the DPCM mode. The coding modes of these previous pixels 1104, typically neighboring pixels, are stored in a mode buffer 1110. The quantization decision process 1110, based on the coding mode(s) of the previous pixel(s), determines the appropriate QP 1114. This QP 1114 is applied to determine the appropriate quantization step and a maximum/minimum value 1120. In some embodiments, this maximum/minimum value may be extended by an extended range parameter 1118, as exemplified in FIGS. 8A and 8B. The extended range 1118 typically increases the appropriate range of values thereby decreasing the chances of the coding mode of the current input sample to be set to the PCM mode. The maximum/minimum value 1120 thus defines an appropriate range of values 1134.

The difference signal or prediction error is also calculated 1130 based on the current sample input 1128 and a predicted value 1124. The predicted value may be based on one or more previously coded/reconstructed samples. The difference signal 1138 and the appropriate range of values 1134 are applied so as to determine if the calculated difference signal is within the range of the maximum and minimum values, i.e., no underflow or overflow 1140. If the difference signal is out of range 1140, the coding mode of the current input sample or pixel is set to PCM mode 1144, otherwise, the coding mode is set to DPCM mode 1148. Based on the coding mode 1144, 1148, the appropriate coded data 194, 196, 198, 1154, 1156 and the coding mode 192, 1152 are outputted, and in some embodiments with an out of range correction processing, e.g., overflow and/or underflow correction processing 1150. This exemplary data flow 1100 is typically repeated for each pixel of an input image. The various processing modules may be a set of program instructions, such as software, hardware, or both, e.g., firmware. The hardware component, for example, may be embodied as chips, circuitries, and other hardware components.

Figure 12:
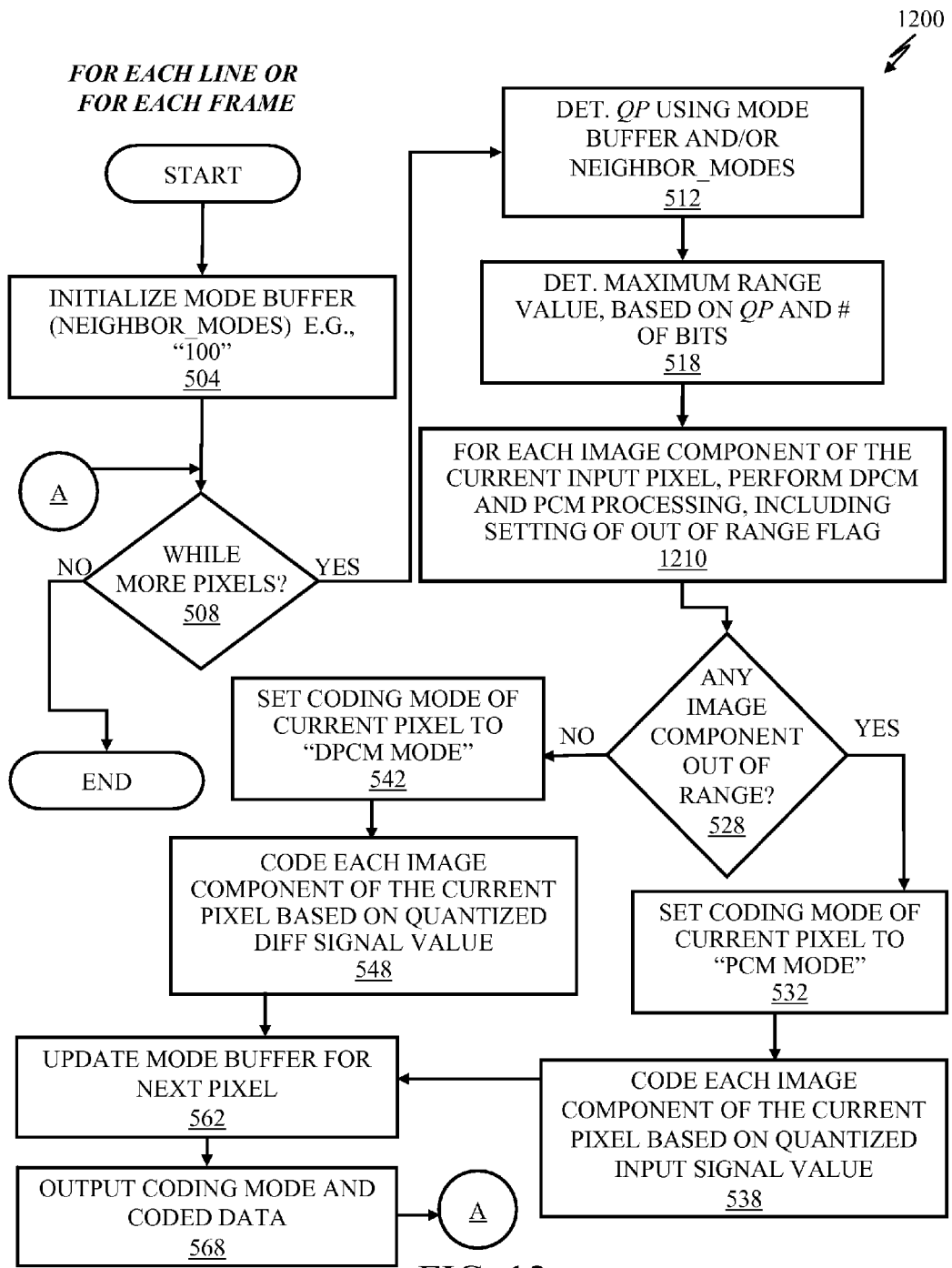
FIG. 12 illustrates a flowchart of another exemplary adaptive quantization process, similar to FIG. 5 with a variation, according to an embodiment of the invention.

FIG. 12 illustrates a flowchart of another exemplary adaptive quantization process 1200, according to an embodiment of the present invention. This exemplary adaptive quantization is similar to that in FIG. 5. The operations similar to those in FIG. 5 are labeled with the same number, and are no longer discussed in this figure.

The adaptive quantization process 1200 of this embodiment, however, calculates the PCM and DPCM values for each input pixel, including appropriately setting the out of range flag (operation 1210). The details of this operation 1210 are shown in FIGS. 13A and 13B.

Figure 13A:
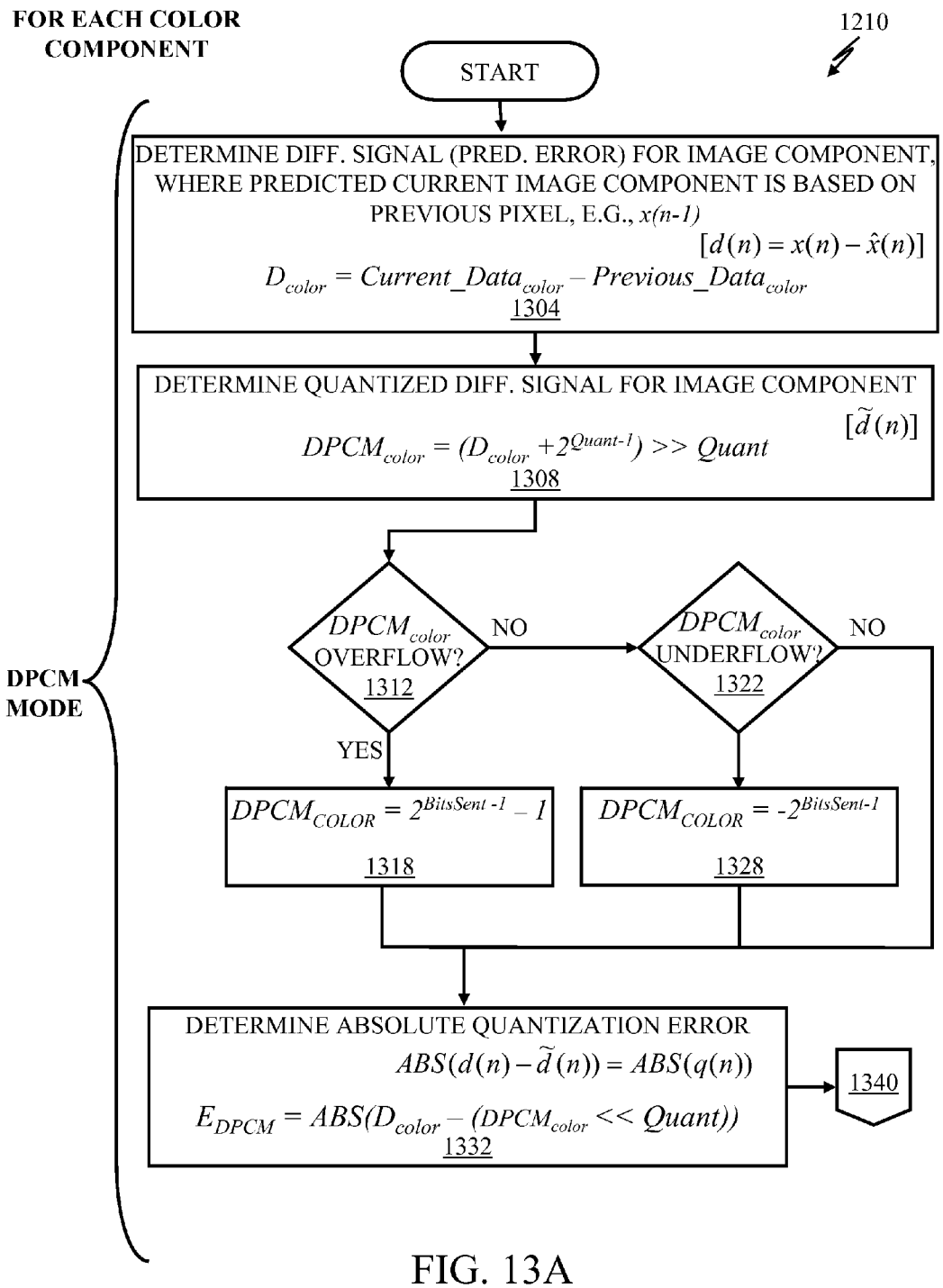
FIGS. 13A and 13B together illustrate an exemplary flowchart of a sub-process of FIG. 12, according to an embodiment of the invention.
Figure 13B:
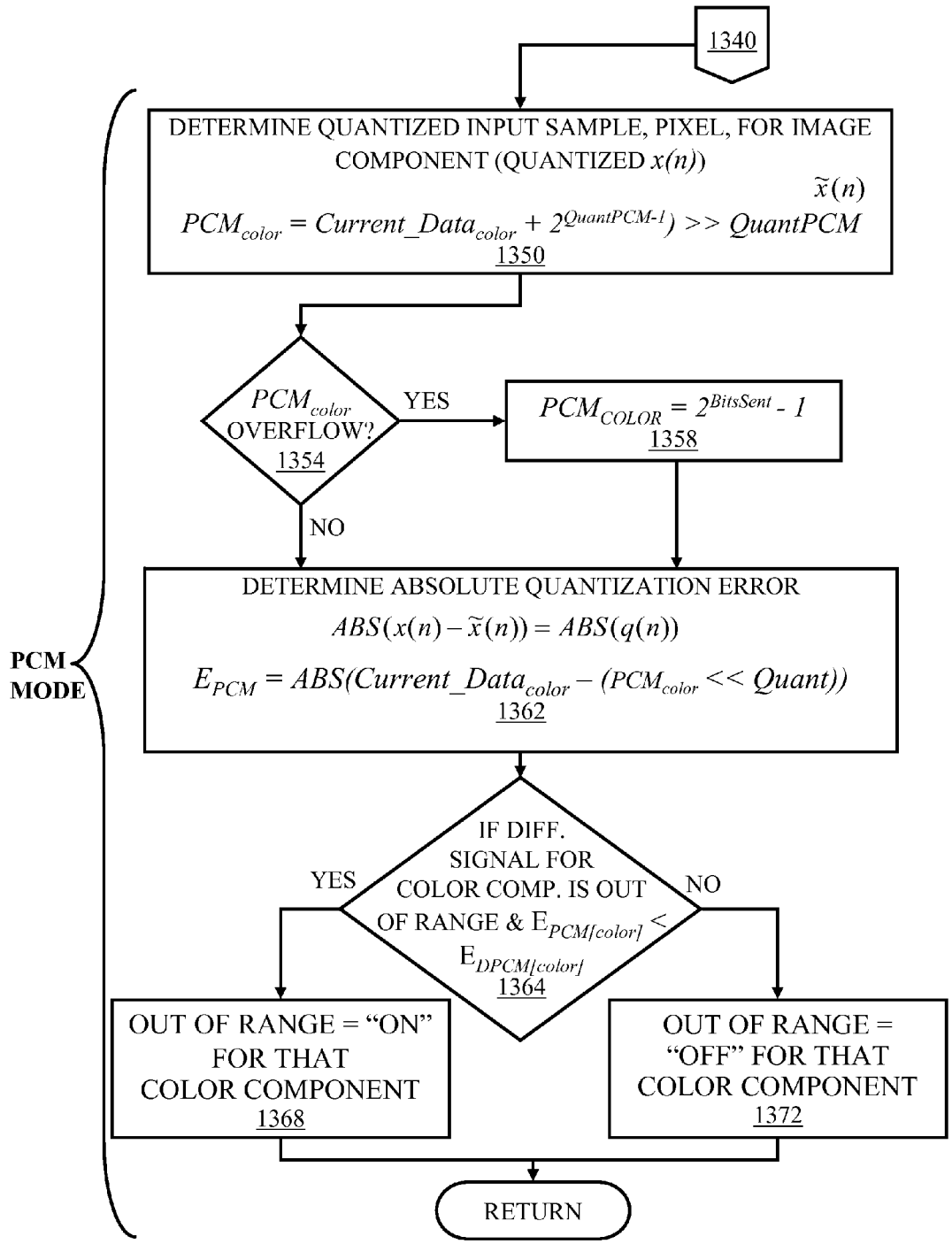

FIGS. 13A and 13B together illustrate an exemplary DPCM and PCM processing (step 1210 of FIG. 12), according to an embodiment of the invention. In general, the DPCM and PCM process 1210 is performed for each image component of the input sample, and in this case the pixel's R, G, B components. The DPCM and PCM processing 1210 may also include the step of determining the difference signal for each color component of the input sample or pixel—$D_{color}$ (step 1304). In the next operation, the quantized difference signal for each color component, $DPCM_{color}$, is determined (step 1308). A check is then made to determine if the quantized difference signal/prediction error value for each color component may cause an overflow or not be appropriately represented in the allocated number of coding bits (step 1312). If the quantized difference signal may cause an overflow, the quantized difference signal value for that color component, $DPCM_{color}$, is set to the maximum appropriate value, such as the maximum value that may be stored in the allocated number of coding bits, e.g., $2^{BitsSent-1}-1$ (step 1318). Otherwise, a check is made if the $DPCM_{color}$ may cause an underflow, e.g., arithmetic overflow, or not be appropriately presented in the allocated number of coding bits (step 1322). If an underflow may occur (step 1322, "yes" branch), $DPCM_{color}$ is set to an appropriate minimum value, e.g., $-2^{BitsSent-1}$ (step 1328). The absolute quantization error for that color component is then determined (step 1332).

The adaptive quantization process also determines the PCM data, e.g., the quantized input sample for the color component, $PCM_{color}$, (step 1350). If the $PCM_{color}$ may cause an overflow (step 1354, "yes" branch), the $PCM_{color}$ is set to the appropriate maximum value, e.g., $-2BitsSent-1$ (step 1358). The absolute quantization error for that color component of the quantized input sample, $E_{PCM}$, is also determined (step 1362).

If the difference signal for that color component is out of range of the appropriate range values and if $E_{PCM}$ is less than $E_{DPCM}$, i.e., if the quantization error of the PCM mode is less than the quantization error of the DPCM mode (step 1364, "yes" branch), then the out of range flag for that color component is appropriately set, e.g., to "on" or "1," otherwise (step 1364, "no" branch), the out of range flag for that color component is cleared or set, for example, to "off" or "0" (step 1372).

FIGS. 14A and 14B together list an exemplary pseudo code 1400A, 1400B of the other exemplary adaptive quantization embodiment of FIGS. 12, 13A and 13B, according to an embodiment of the invention.

Figure 15:
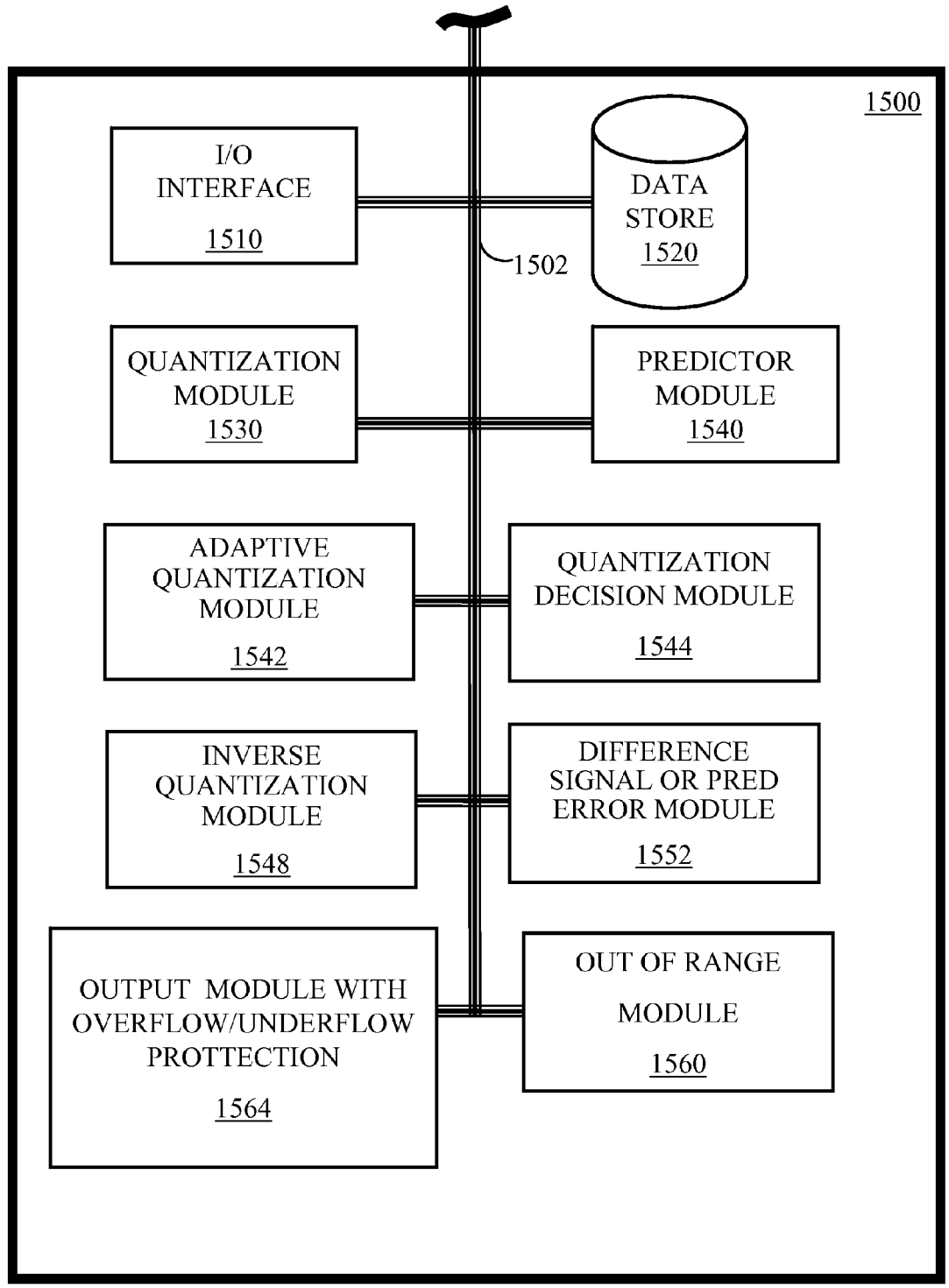
FIG. 15 is a block diagram of an exemplary device adapted to perform the adaptive quantization processes described herein, according to an embodiment of the invention.

FIG. 15 is a block diagram of an exemplary device 1500 adapted to perform the adaptive quantization processes described herein, according to an embodiment of the invention. The exemplary device 1500 may include an input/output I/O interface card 1510 adapted to enable the device 1500 to communicate, including transmit and receive data, with other devices, such as with another image processing device. If the device 1500, however, is a stand-alone device, the I/O interface card 1510 may be omitted. The exemplary device 1500 may also include a data store 1520, which may be volatile or non-volatile memory, for storing data, including the reconstructed pixel buffer 144, 244 and/or a mode buffer 130, 230. Such a data store may also be remote and external to the device 1500. The exemplary device 1500 may also include a quantization module 1530 adapted to perform quantization functions, and a predictor module 1540 adapted to determine predicted input values, as described above. The exemplary device 1500 may also include an adaptive quantization module 1542, adapted to provide adaptive quantization parameters. The quantization decision module 1544, which may interface with the mode buffer, determines and assigns the appropriate QP to apply based on the coding modes of neighboring one or more previous pixels. The difference signal/prediction error module 1552 is adapted to determine the difference signal/prediction error. The out of range module 1560 may be adapted to determine if certain values, such as the quantized input sample value and/or the quantized difference signal value, are outside an appropriate range of values. This out of range module 1560 may also determine the appropriate range of values. The inverse quantization module 1548 may be adapted to perform inverse quantization operations. The output module 1564 may be adapted to output 142 the coding mode 192 and the coded data 194, with optional out of range correction processing, such as underflow and/or overflow correction processing. In some embodiments of the invention, the different modules in FIG. 15 may communicate and interface with each other via a bus, dedicated signal paths or one or more channels 1502.

Depending on the function of the device 1500, other modules, including functions and capabilities may be added, removed, and/or modified. The modules in the exemplary device described herein may be modified, such as further subdivided and combined with other functions so long as the function and processes described herein may be performed. For example, an entropy coder module adapted to perform entropy coding may be included in this device. In other embodiments, a module adapted to code the output of the adaptive quantization process in a computer-readable medium may also be included. Furthermore, a communications module adapted to enable streaming output to be transmitted to a receiving device, e.g., decoder, may also be included. The exemplary device, for example, may also include an absolute quantization module adapted to determine the quantization error of the quantized difference sample and/or the quantized input sample, depending on the adaptive quantization process that the device is adapted to perform. The various modules may also be implemented in hardware—e.g., circuits, chips, and/or as a specialized computing device, as a set of program instructions, e.g., software, or both, i.e., firmware. The exemplary module 1500 may be both a coder, and a decoder, depending on the modules included in the exemplary device.

Figure 16:
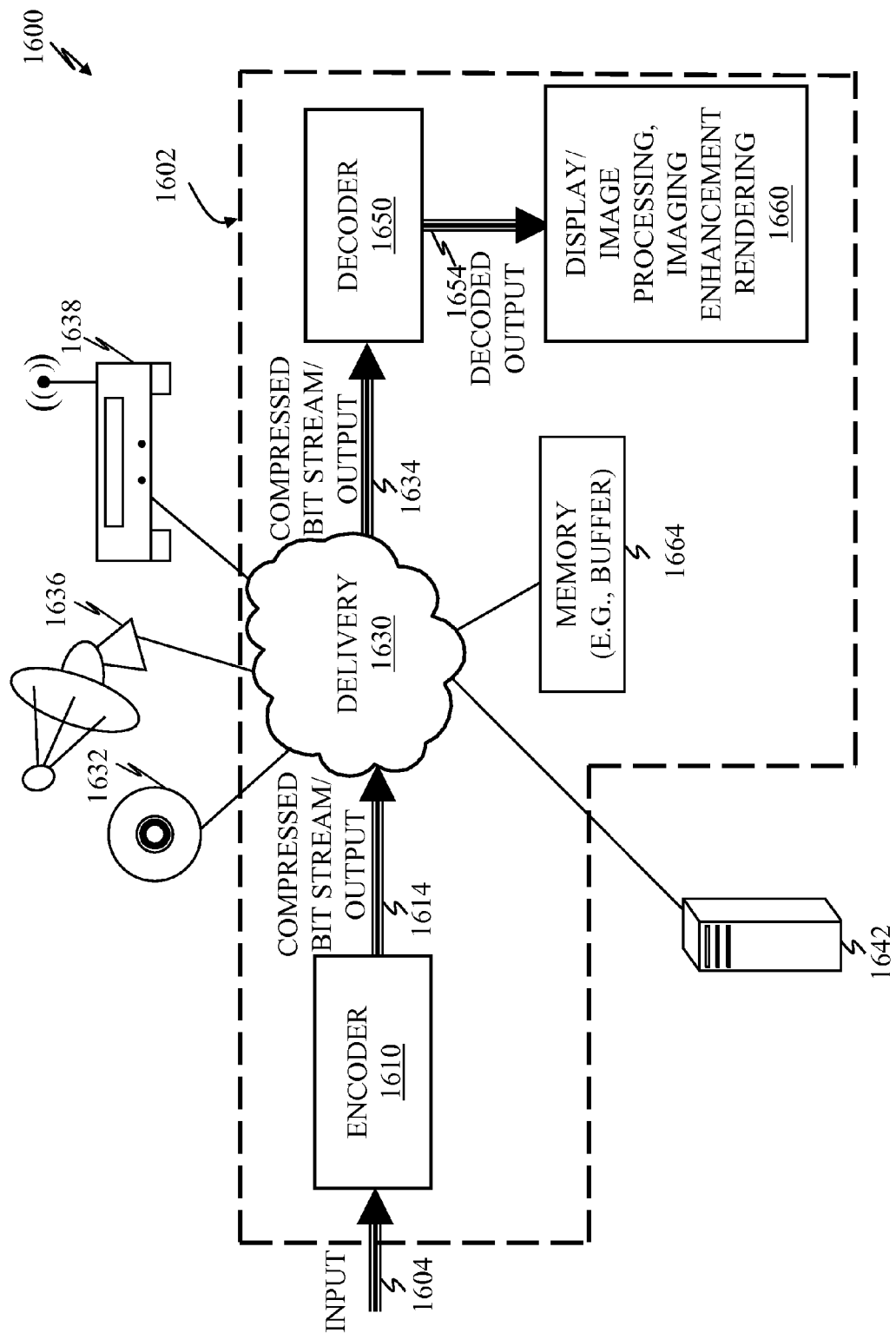
FIG. 16 is a high-level block diagram of an exemplary adaptive quantization system and/or device, according to embodiments of the invention.

FIG. 16 is an exemplary system 1600 according to an embodiment of the invention. The system 1600 typically includes an encoder 1610, a delivery or transport medium 1630, and a decoder 1650. The encoder 1610 receives input signals 1604, which may be in analog or digital form, and may be in an uncompressed form typically. These signals, which may be an image or a sequence of images, may then be coded and compressed by an encoder 1610 of the present invention adapted to perform the one or more adaptive quantization processes of the present invention. In some embodiments, the encoder 1610, the decoder 1650, or both are embodied as codecs. A codec in general is a device or a set of program instructions, e.g., software, adapted to encode and decode a digital data stream or signal. The compressed bit stream 1614 or the coded output compressed by the encoder 1610 is then typically delivered via a delivery or transport medium 1630. The coded output as discussed above includes the coding modes and their associated coded data. The delivery medium 1630 may include broadcast 1636, e.g., cable, terrestrial, or satellite broadcast, a wide area network such as the Internet, and a wired and/or wireless medium, which may include a delivery medium, for example, to memory 1664, which may be local or remote to the encoder 1610. In other embodiments, the transport medium is a digital versatile or video disc (DVD) 1632, a set-top box 1638, or a media server 1642. Other embodiments of delivering the compressed bit stream or output 1614 are known to those of ordinary skill in the art. In some embodiments, the compressed bit stream or output 1614, 1634 may include other information, e.g., when packetized for transmission over the Internet. The compressed bit stream/output 1634 is then received by the decoder 1650, which then decodes the compressed bit stream, based on the coding modes received, to obtain a decoded output 1654 for further image enhancement processing, rendering, or presentation 1660, or any other image processing operations.

In some embodiments, the system as shown in FIG. 16 may be embodied in one device 1602, outlined by the dashed lines, where such device includes the encoder module 1610, a memory 1664, and a decoder module 1650. For example, an input of 60 frames per second may be reduced by the encoder 1610 of the present invention to 30 frames per second, and stored temporarily in memory 1664, while waiting for the decoder 1650 to decode such input signals for further image processing, for example, for high-definition imaging applications. By using the adaptive quantization features described herein, the memory size 1664 may potentially be reduced by half. The delivery medium 1630 in this exemplary device 1602 may be dedicated signal paths, shared memory, bus, channels, and other means as known to those of ordinary skill in the art.

Embodiments of the present invention may be used in conjunction with other coding systems, devices, and processes that perform intra-coding. Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. For example, although the embodiments of the present invention are discussed herein in relation to an image with R, G, and B components, the embodiments of the present invention may also apply to other images with other image components, such as black and white, grayscale, and cyan-magenta-yellow-black (CMYK) images. Furthermore, the quantization index may be modified such that it may be based on a different number of previous pixels. Furthermore, the number of quantization parameters and/or steps may be varied and yet still be in the scope of the present invention, such that embodiments may be created with more than or less than eight adaptive quantization parameters. Furthermore, the values of the quantization size parameters may be modified. One of ordinary skill in the art will also appreciate that the modules and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

We claim:

1. A method of processing an image comprising a plurality of pixels, the method comprising:

determining a range of values based on a number of coding bits and a quantization parameter;

determining a difference signal value based on a sample pixel of the image, and a predicted value of the sample pixel;

determining a quantized difference signal value based on the determined difference signal value and the quantization parameter;

determining a quantized sample pixel value based on the sample pixel and a value of the determined range of values based on the coding bits;

determining a differential pulse-code modulation (DPCM) error based on deducting the determined quantized difference signal value from the determined difference signal value;

determining a pulse-code modulation (PCM) quantization error based on deducting the determined quantized sample pixel value from the sample pixel;

and if the determined difference signal value is within the determined range of values and if the determined PCM quantization error is greater than or equal to the determined DPCM error, then assigning a sample pixel coding mode comprising one bit associated with the sample pixel to a mode indicating that the sample pixel is coded as data.

2. The method of claim 1, wherein the determining of the quantized sample pixel value further comprises:
   determining of the quantized sample pixel value based on one or more previously coded pixels of the image, wherein the each previously coded pixel is associated with a coding mode comprising one bit indicating whether the each previously coded pixel is coded as a PCM data or a DPCM data, and wherein the each previously coded pixel is a neighbor pixel of the sample pixel.

3. The method of claim 2, wherein the determining of the quantized sample pixel value further comprises concatenating the one bit coding modes of the one or more previously coded pixels to define the quantized sample pixel value.

4. The method of claim 2, wherein the determining of the quantized sample pixel value further comprises applying a formula based on the one bit coding modes of the one or more previously coded pixels to define the quantized sample pixel value.

5. The method of claim 2, wherein the determining of the quantized sample pixel value is based on at least two previously coded pixels of the image.

6. The method of claim 1, further comprising:
   if the difference signal is within the range of values and if the determined PCM quantization error is greater than or equal to the determined DPCM error, then
      determining whether the quantized difference signal is an overflow value based on the determined range of values; and
      if the quantized difference signal is an overflow value, then the coding of the sample pixel as a quantized difference signal is based on an assigned maximum value adapted to be represented by the number of coding bits, and wherein the quantized difference signal in the coding of the sample pixel is the assigned maximum value.

7. The method of claim 1, further comprising:
   if the difference signal is within the range of values and if the determined PCM quantization error is greater than or equal to the determined DPCM error, then
      determining whether the quantized difference signal is an underflow value based on the determined range of values; and
      if the quantized difference signal is an underflow value, then the coding of the sample pixel as a quantized difference signal is based on an assigned minimum value adapted to be represented by the number of coding bits, and wherein the quantized difference signal in the coding of the sample pixel is the assigned minimum value.

8. The method of claim 1, wherein the coding of the sample pixel as a quantized difference signal, further comprises rounding the quantized difference signal prior to coding the quantized difference signal based on the quantization parameter.

9. The method of claim 1, wherein the determining of the difference signal value further comprises rounding the difference signal value.

10. The method of claim 1, wherein the determining of the range of values is further based on an extended range value.

11. The method of claim 1, wherein the method is repeated for a next pixel of the image.

12. The method of claim 1 wherein assigning a sample pixel coding mode further comprises:
   coding the sample pixel as the quantized difference signal; and
   outputting the sample pixel coding mode and the quantized difference signal value as an output data.

13. The method of claim 12 wherein if the difference signal is not within the range of values and if the PCM quantization error is less than the DPCM error, then
   assigning the sample pixel coding mode comprising one bit associated with the sample pixel to a mode indicating that the sample pixel is coded as pulse-code modulation (PCM) data;
   coding the sample pixel as the quantized sample pixel value; and
   outputting the sample pixel coding mode and the quantized sample pixel value as an output data.

14. The method of claim 13, further comprising:
   if the difference signal is not within the range of values and if the PCM quantization error is greater than or equal to the DPCM error, then prior to coding the sample pixel as the quantized sample pixel value,
      determining whether the quantized sample pixel value is an overflow value based on the number of coding bits; and
      if the quantized sample pixel value is an overflow value, then the coding of the sample pixel as a quantized sample pixel value is based on an assigned maximum value adapted to be represented by the number of coding bits, and wherein the quantized sample pixel value in the coding of the sample pixel is the assigned maximum value.

15. The method of claim 13, further comprising:
   receiving any of the output data;
   reading from the received output data the sample pixel coding mode; and
   if the read sample pixel coding mode indicates DPCM data then constructing the sample pixel of the image based on the coded quantized difference signal; and
   if the read sample pixel coding mode indicates PCM data then constructing the sample pixel of the image based on the coded quantized sample pixel value.

16. A method of processing an image comprising a plurality of pixels, the method comprising:
   receiving a sample pixel of said image;
   determining a difference signal value based on said sample pixel and a predicted value of said sample pixel;
   determining a quantized difference signal value based on said difference signal value and a quantization parameter;
   determining a differential pulse-code modulation (DPCM) error based on deducting said quantized difference signal value from said difference signal value;
   determining a range of values based on a number of coding bits and said quantization parameter;
   determining a quantized sample pixel value based on said received sample pixel and a value of said determined range of values based on said coding bits;
   determining a pulse-code modulation (PCM) quantization error based on deducting said quantized sample pixel value from said received sample pixel;
   if said difference signal value is not within said determined range of values and if said PCM quantization error is less than said DPCM error, then assigning said sample pixel coding mode comprising one bit associated with said sample pixel to a mode indicating that said sample pixel is coded as PCM data;

coding said sample pixel as said quantized sample pixel value; and outputting said sample pixel coding mode and said quantized sample pixel value as an output data;

otherwise, assigning a sample pixel coding mode comprising one bit associated with said sample pixel to a mode indicating that said sample pixel is coded as DPCM data;

coding said sample pixel as said quantized difference signal; and outputting said sample pixel coding mode and said quantized difference signal as an output data.

17. The method of claim 16, further comprising:
determining of said quantized sample pixel value based on one or more previously coded pixels of said image, wherein said each previously coded pixel is associated with a coding mode comprising one bit indicating whether said each previously coded pixel is coded as a PCM data or a DPCM data, and wherein said each previously coded pixel is a neighbor pixel of said sample pixel.

18. The method of claim 16, wherein said determining of said quantized difference signal value further comprises:
determining whether said determined quantized difference signal value is an overflow value based on said number of coding bits; and
if said determined quantized difference signal value is an overflow value then the coding of said sample pixel as a quantized difference signal is based on an assigned maximum value adapted to be represented by said number of coding bits, and wherein said quantized difference signal in said coding of said sample pixel is said assigned maximum value.

19. The method of claim 16, wherein said determining of said quantized difference signal value further comprises:
determining whether said determined quantized difference signal value is an underflow value based on said number of coding bits; and
if said determined quantized difference signal value is an overflow value then the coding said sample pixel as a quantized difference signal is based on an assigned minimum value adapted to be represented by said number of coding bits, and wherein said quantized difference signal in said coding of said sample pixel is said assigned minimum value.

20. The method of claim 16, further comprising:
receiving any of said output data by a receiver; and
reading from said received output data said sample pixel coding mode;
if said read sample pixel coding mode indicates DPCM data then constructing said sample pixel of said image based on said coded quantized difference signal; and
if said read sample pixel coding mode indicates PCM data then constructing said sample pixel of said image based on said coded quantized sample pixel value.

21. A device adapted to process an image comprising a plurality of pixels, the device comprising:
a pulse-code modulation module adapted to:
determine a quantized sample pixel value based on a sample pixel of the image; and
an adaptive quantization module adapted to:
determine a range of values based on a number of coding bits and a quantization parameter;

determine a difference signal value based on the sample pixel and a predicted value of the sample pixel;

determine a quantized difference signal value based on the determined difference signal value and the determined quantization parameter;

determine a differential pulse-code modulation (DPCM) error based on deducting the determined quantized difference signal value from the determined difference signal value;

determine a pulse-code modulation (PCM) quantization error based on deducting the determined quantized sample pixel value from the sample pixel;

and if the determined difference signal value is within the determined range of values and if the determined PCM quantization error is less than the determined DPCM error, then assign a sample pixel coding mode comprising one bit associated with the sample pixel to a mode indicating that the sample pixel is coded as DPCM data.

22. The device of claim 21 wherein if the difference signal value is within the determined range of values and if the PCM quantization error is less than the DPCM error, then the adaptive quantization module is further adapted to:
code the sample pixel as a quantized difference signal based on the quantization parameter; and
output the sample pixel coding mode and the quantized difference signal value as an output data.

23. The device of claim 21 wherein if the difference signal value is not within the determined range of values and if the PCM quantization error is greater than or equal to the DPCM error, then the adaptive quantization module is further adapted to:
assign the sample pixel coding mode comprising one bit associated with the sample pixel to a mode indicating that the sample pixel is coded as pulse-code modulation (PCM) data;
code the sample pixel as the quantized sample pixel value; and
output the sample pixel coding mode and the quantized sample pixel value as an output data.

24. A device adapted to process an image comprising a plurality of pixels, the device comprising:
a receiver adapted to receive a sample pixel of said image;
a pulse-code modulation module adapted to:
determine a quantized sample pixel value based on said received sample pixel and a value of said determined range of values based on said coding bits; and
an adaptive quantization module adapted to:
determine a difference signal value based on said sample pixel and a predicted value of said sample pixel;
determine a quantized difference signal value based on said difference signal value and a quantization parameter;
determine a differential pulse-code modulation (DPCM) error based on deducting said quantized difference signal value from said difference signal value;
determine a pulse-code modulation (PCM) quantization error based on deducting said quantized sample pixel value from said received sample pixel;
determine a range of values based on a number of coding bits and said quantization parameter;

if said difference signal value is not within said determined range of values and if said PCM quantization error is less than said DPCM error, then
assign said sample pixel coding mode comprising one bit associated with said sample pixel to a mode indicating that said sample pixel is coded as PCM data;
code said sample pixel as said quantized sample pixel value; and
output said sample pixel coding mode and said quantized sample pixel value as an output data;

otherwise,
assign a sample pixel coding mode comprising one bit associated with said sample pixel to a mode indicating that said sample pixel is coded as DPCM data;
code said sample pixel as said quantized difference signal; and
output said sample pixel coding mode and said quantized difference signal as an output data.

* * * * *